US012214801B2

(12) United States Patent
Wang et al.

(10) Patent No.: US 12,214,801 B2
(45) Date of Patent: Feb. 4, 2025

(54) GENERATING AUTONOMOUS VEHICLE TESTING DATA THROUGH PERTURBATIONS AND ADVERSARIAL LOSS FUNCTIONS

(71) Applicant: Aurora Operations, Inc., Pittsburgh, PA (US)

(72) Inventors: Jingkang Wang, Toronto (CA); Ava Alison Pun, Toronto (CA); Xuanyuan Tu, Milton (CA); Mengye Ren, Toronto (CA); Abbas Sadat, Toronto (CA); Sergio Casas, Toronto (CA); Sivabalan Manivasagam, Toronto (CA); Raquel Urtasun, Toronto (CA)

(73) Assignee: AURORA OPERATIONS, INC., Pittsburgh, PA (US)

( * ) Notice: Subject to any disclaimer, the term of this patent is extended or adjusted under 35 U.S.C. 154(b) by 541 days.

(21) Appl. No.: 17/528,549

(22) Filed: Nov. 17, 2021

(65) Prior Publication Data
US 2022/0153298 A1    May 19, 2022

Related U.S. Application Data

(60) Provisional application No. 63/114,782, filed on Nov. 17, 2020.

(51) Int. Cl.
*B60W 60/00* (2020.01)
*G06N 3/086* (2023.01)

(52) U.S. Cl.
CPC .... *B60W 60/0011* (2020.02); *B60W 60/0013* (2020.02); *B60W 60/00276* (2020.02); *G06N 3/086* (2013.01); *B60W 2420/408* (2024.01)

(58) Field of Classification Search
None
See application file for complete search history.

(56) References Cited

U.S. PATENT DOCUMENTS

| | | | | |
|---|---|---|---|---|
| 2019/0147320 A1* | 5/2019 | Mattyus | ............... | G06V 20/182 |
| | | | | 382/155 |
| 2019/0303759 A1* | 10/2019 | Farabet | ................... | G05D 1/00 |

(Continued)

OTHER PUBLICATIONS

Abeysirigoonawardena et al, "Generating Adversarial Driving Scenarios in High-Fidelity Simulators", International Conference on Robotics and Automation, May 20-24, 2019, Montreal, Canada, 7 pages.

(Continued)

*Primary Examiner* — Brian P Sweeney
*Assistant Examiner* — Jonathan E Reinert
(74) *Attorney, Agent, or Firm* — Dority & Manning, P.A.

(57) ABSTRACT

Techniques for generating testing data for an autonomous vehicle (AV) are described herein. A system can obtain sensor data descriptive of a traffic scenario. The traffic scenario can include a subject vehicle and actors in an environment. Additionally, the system can generate a perturbed trajectory for a first actor in the environment based on perturbation values. Moreover, the system can generate simulated sensor data. The simulated sensor data can include data descriptive of the perturbed trajectory for the first actor in the environment. Furthermore, the system can provide the simulated sensor data as input to an AV control system. The AV control system can be configured to process the simulated sensor data to generate an updated trajectory for the subject vehicle in the environment. Subsequently, the system can evaluate an adversarial loss function based on the updated trajectory for the subject vehicle to generate an adversarial loss value.

19 Claims, 10 Drawing Sheets

(56) References Cited

U.S. PATENT DOCUMENTS

| | | | |
|---|---|---|---|
| 2020/0180647 A1* | 6/2020 | Anthony | G06N 3/08 |
| 2020/0209874 A1* | 7/2020 | Chen | B60W 50/04 |
| 2020/0257291 A1* | 8/2020 | Zhang | B60W 40/101 |
| 2020/0339109 A1* | 10/2020 | Hong | B60W 30/08 |
| 2021/0097148 A1* | 4/2021 | Bagschik | G06F 30/15 |

OTHER PUBLICATIONS

Alzantot et al, "GenAttack: Practical Black-Box Attacks with Gradient-Free Optimization", arXiv:1805.11090v3, Jul. 1, 2019, 9 pages.
Andriushchenko et al, "Square Attack: A Query-Efficient Black-Box Adversarial Attack via Random Search", arXiv:1912.00049v3, Jul. 29, 2020, 34 pages.
Athalye et al, "Synthesizing Robust Adversarial Examples", arXiv:1707.07397v3, Jun. 7, 2018, 19 pages.
Bengio, et al, "Curriculum Learning", In ICML, 2009.
Bewley et al, "Learning to Drive from Simulation Without Real World Labels", arXiv:1812.03823v2, Dec. 13, 2018, 8 pages.
Bojarski et al, "End to End Learning for Self-Driving Cars", arXiv:1604.07316v1, Apr. 25, 2016, 9 pages.
Brown et al, "Adversarial Patch", arXiv:1712.09665v2, May 17, 2018, 6 pages.
Cao et al, "Adversarial Objects Against LiDAR-Based Autonomous Driving Systems", arXiv:1907.05418v1, Jul. 11. 2019, 14 pages.
Cao et al, "Adversarial Sensor Attack on LiDAR-Based Perception in Autonomous Driving", arXiv:1907.06826v2, Aug. 20, 2019, 15 pages.
Casas et al, "IntentNet: Learning to Predict Intention from Raw Sensor Data", arXiv:2101.07907v1. Jan. 20, 2021, 10 pages.
Chen et al, "Adversarial Evaluation of Autonomous Vehicles in Lane-Change Scenarios", arXiv:2004.06531v2, Nov. 23, 2020, 10 pages.
Codevilla et al, "End-to-End Driving via Conditional Imitation Learning", arXiv:1710.02410v2, Mar. 2, 2018, 8 pages.
Pomerleau, "ALVINN: An autonomous land vehicle in a neural network", Conference on Neural Information Processing Systems, Nov. 27-30, 1989, pp. 305-313.
Ding et al, "Learning to Collide: An Adaptive Safety-Critical Scenarios Generating Method", arXiv:2003.01197v3, Jul. 23, 2020, 8 pages.
Ding et al, "Multimodal Safety-Critical Scenarios Generation for Decision-Making Algorithms Evaluation", arXiv:2009.08311v3, Dec. 26, 2020, 8 pages.
Dosovitskiy et al, "CARLA: An Open Urban Driving Simulator", arXiv:1711.03938v1, Nov. 10, 2017, 16 pages.
Eykholt et al, "Robust Physical-World Attacks on Deep Learning Visual Classification", arXiv:1707.08945v5, Apr. 10, 2018, 11 pages.
Guo et al, "Simple Black-Box Adversarial Attacks", arXiv:1905.07121v2, Aug. 15, 2019, 14 pages.
Hawke et al, "Urban Driving with Conditional Imitation Learning", arXiv:1912.00177v2, Dec. 5, 2019, 8 pages.
Ilyas et al, "Prior Convictions: Black-Box Adversarial Attacks with Bandits and Priors", arXiv:1807.07978v3, Mar. 28, 2019, 23 pages.
Ilyas, et al, "Black-Box Adversarial Attacks with Limited Queries and Information", arXiv:1804.08598v3, Jul. 11, 2018, 10 pages.
Kendall et al, "Learning to Drive in a Day", arXiv:1807.00412v2. Sep. 11, 2018, 7 pages.
Klischat et al, "Generating Critical Test Scenarios for Automated Vehicles with Evolutionary Algorithms", Intelligent Vehicle Synopsis, Jun. 9-12, 2019, Paris, France, 7 pages.
Koschi et al, "Computationally Efficient Safety Falsification of Adaptive Cruise Control Systems", Intelligent Transportation Systems Conference, Oct. 27-30, 2019, Auckland, New Zealand, 8 pages.
Liu et al, "Beyond Pixel Norm-Balls: Parametric Adversaries using an Analytically Differentiable Renderer", arXiv:1808.02651v2, Feb. 17, 1019, 21 pages.
Luo et al, "Fast and furious: Real time End-to-End 3D Detection, Tracking and Motion Forecasting with a Single Convolutional Net", arXiv:2012.12395v1, Dec. 22, 2020, 9 pages.
Madrigal, "Inside Waymo's Secret World for Training Self-Driving Cars", The Atlantic, Aug. 23, 2017, 25 pages.
Madry, et al, "Towards Deep Learning Models Resistant to Adversarial Attacks", arXiv:1706.06083v4. Sep. 4, 2019, 28 pages.
Man et al, "Genetic Algorithms: Concepts and Applications", Transactions on Industrial Electronics, vol. 43, No. 5, Oct. 1996, pp. 519-534.
Manivasagam et al, "LiDARsim: Realistic LiDAR Simulation by Leveraging the Real World", arXiv:2006.09348v1, Jun. 16, 2020, 11 pages.
Muller et al, "Driving Policy Transfer via Modularity and Abstraction", arXiv:1804.09364,3, Dec. 13, 2018, 15 pages.
Norden et al, "Efficient Black-Box Assessment of Autonomous Vehicle Safety", arXiv:1912.03618v2, Jun. 6, 2020, 14 pages.
O'Kelly et al, "Scalable End-to-End Autonomous Vehicle Testing via Rare-Event Simulation", arXiv:1811.00145v3, Jan. 12, 2019, 18 pages.
Philion et al, "Lift, Splat, Shoot: Encoding Images from Arbitrary Camera Rigs by Implicitly Unprojecting to 3D", arXiv:2008.05711v1, Aug. 13, 2020, 17 pages.
Polack, et al, "The Kinematic Bicycle Model: A Consistent Model for Planning Feasible Trajectories for Autonomous Vehicles?", Intelligent Vehicles Symposium, Jun. 11-14, 2017, Redondo Beach, California, United States, 7 pages.
Rosero et al, "A Software Architecture for Autonomous Vehicles: Team LRM-B Entry in the First Carla Autonomous Driving Challenge", arXiv:2010,12598v1, Oct. 23, 2020, 16 pages.
Ru et al, "BayesOpt Adversarial Attack", International Conference on Learning Representations, Apr. 26-May 1, 2020, Addis Ababa, Ethiopia, 16 pages.
Sadat et al, "Jointly Learnable Behavior and Trajectory Planning for Self-Driving Vehicles", arXiv:1910.04586v1, Oct. 10, 2019, 8 pages.
Sadat et al, "Perceive, Predict, and Plan: Safe Motion Planning Through Interpretable Semantic Representations". arXiv:2008.05930v1, Aug. 13, 2020, 28 pages.
Samak et al, "Robust Behavioral Cloning for Autonomous Vehicles Using End-to-End Imitation Learning", arXiv:2010.04767, 17 pages.
Sinha et al, "Neural Bridge Sampling for Evaluating Safety Critical Autonomous Systems", arXiv:2008.10581v3, Aug. 8, 2021, 27 pages.
Srinivas et al, "Gaussian Process Optimization in the Bandit Setting: No Regret and Experimental Design", arXiv:0912.3995v4, Jun. 9, 2010, 17 pages.
Sun et al, "Towards Robust LiDAR-based Perception in Autonomous Driving: General Black-Box Adversarial Sensor Attack and Countermeasures", arXiv:2006.16974v1, Jun. 30, 2020, 18 pages.
Tu et al, "Physically Realizable Adversarial Examples for Lidar Object Detection", arXiv:2004.00543v2, Apr. 2, 2020, 10 pages.
Wachi, "Failure-Scenario Maker for Rule-Based Agent using Multi-Agent Adversarial Reinforcement Learning and its Application to Autonomous Driving", arXiv:1903.10654v3, May 25, 2019, 8 pages.
Werling et al, "Optimal Trajectory Generation for Dynamic Street Scenarios in a Frenet Frame", International Conference on Robotics and Automation, May 3-8, 2010, Anchorage, Alaska, 7 pages.
Wu et al, "Physical Adversarial Attack on Vehicle Detector in The Carla Simulator", arXiv:2007.16118v2, Aug. 7, 2020, 9 pages.
Xiao et al. "MeshAdv: Adversarial Meshes for Visual Recognition", arXiv:1810.05206v2, Jun. 29, 2019, 13 pages.
Xu et al, "Evading Real-Time Person Detectors by Adversarial T-Shirt", arXiv:1910.11099v3, Jul. 6, 2020, 23 pages.
Zeng et al, "Adversarial Attacks Beyond the Image Space", arXiv:1711.07183v6, Apr. 6, 2019, 11 pages.
Zeng et al, "DSDNet: Deep Structured Self-Driving Network", arXiv:2008.06041v1, Aug. 13, 2020, 24 pages.
Zeng et al, "End-to-End Interpretable Neural Motion Planner", arXiv:2101.06679v1, Jan. 17, 2021, 10 pages.
Zhang et al, "CAMOU: Learning Physical Vehicle Camouflages to Adversarially Attack Detectors in the Wild", Conference on Learning Representation, May 6-9, 2019, New Orleans, Louisiana, United States, 20 pages.

(56) References Cited

OTHER PUBLICATIONS

Ziegler et al, "Trajectory Planning for Bertha—A Local, Continuous Method", Intelligent Vehicle Symposium, Jun. 8-14, 2014, Dearborn, Michigan, United States, pp. 450-457.

* cited by examiner

GENERATING AUTONOMOUS VEHICLE TESTING DATA THROUGH PERTURBATIONS AND ADVERSARIAL LOSS FUNCTIONS

RELATED APPLICATION

The present application is based on and claims the benefit of U.S. Provisional Patent Application No. 63/114,782 having a filing date of Nov. 17, 2020, which is incorporated by reference herein in its entirety.

BACKGROUND

An autonomous platform can process data to perceive an environment through which the platform can travel. For example, an autonomous vehicle can perceive its environment using a variety of sensors and identify objects around the autonomous vehicle. The autonomous vehicle can identify an appropriate path through the perceived surrounding environment and navigate along the path with minimal or no human input.

SUMMARY

Aspects and advantages of embodiments of the present disclosure will be set forth in part in the following description, or may be learned from the description, or may be learned through practice of the embodiments. The present disclosure is directed to systems and methods for generating testing data for autonomous systems (e.g., autonomous vehicles). In particular, in some implementations, to synthesize testing or training data for an autonomous vehicle, a computing system obtains sensor data descriptive of a traffic scenario that includes a subject vehicle (e.g., autonomous vehicle) and one or more actors (e.g., objects, other vehicles, pedestrians, etc.) in an environment (e.g., a travel way such as a roadway). The computing system selects one or more perturbation values from a defined perturbation search space. As one example, the computing system performs a black-box optimization technique to select the perturbation values from the defined perturbation search space. The perturbation values describes how a trajectory of an actor is perturbed to synthesize a new traffic scenario. In particular, the computing system generates an adversarial trajectory for a first actor of the one or more actors in the environment based on the one or more perturbation values. The computing system then generates simulated sensor data descriptive of the adversarial trajectory for the first actor in the environment. The simulated sensor data is used for testing and/or training the autonomous system (e.g., subject vehicle, autonomous vehicle).

According to one aspect of the present disclosure, the computing system selects the one or more perturbation values with an objective of optimizing an adversarial loss value provided by an adversarial loss function that evaluates an updated trajectory generated for the subject vehicle by an autonomous vehicle control system based on the simulated sensor data. For example, the computing system facilitates input of the simulated sensor data to the autonomous vehicle control system. In response, the autonomous vehicle control system outputs an updated trajectory for the subject vehicle. An adversarial loss function evaluates the updated trajectory generated for the subject vehicle. Because the computing system selects the one or more perturbation values with the objective of optimizing the adversarial loss value provided by the adversarial loss function, the computing system synthesizes increasingly adversarial (e.g., difficult or challenging from the perspective of the subject vehicle) traffic scenarios. Thus, aspects of the present disclosure use an adversarial approach to generate challenging testing scenarios for autonomous vehicles.

More particularly, as autonomous systems become better, simulating scenarios where the autonomy stack may fail becomes more important. Traditionally, those scenarios are generated for a few scenes with respect to the planning module that takes ground-truth actor states as input. This does not scale and cannot identify all possible autonomy failures, such as perception failures due to occlusion. To resolve this issue, the present disclosure provides an adversarial framework to generate challenging testing scenarios for any autonomy system (e.g., a LiDAR-based autonomy system). In particular, in some example implementations, given an initial traffic scenario, the proposed framework modifies the actors' trajectories in a physically plausible manner and update the sensor data (e.g., LiDAR sensor data) to match the perturbed world. Importantly, by simulating directly from sensor data, the system generates adversarial scenarios that are challenging for the full autonomy stack.

Specifically, some example implementations of the present disclosure seek to generate worst-case scenarios as a black box adversarial attack that tests any autonomy system. The system explores adversarial perturbations with respect to physically feasible changes in actor behavior, since such perturbations provide insight into the different types of driving situations that are challenging. This contrasts previous work on black box attacks for perception systems that perturb appearance and texture, but do not perturb actor behavior.

In particular, certain example implementations leverage real world traffic scenarios available in autonomous datasets and optimize the actors' trajectories jointly to increase the risk of an autonomy system failure. As some example perturbations modify the actors' trajectories, the system then adjusts the sensor data to accurately reflect the actors' new locations. One example approach includes using a high-fidelity LiDAR simulator that modifies the sensor data accordingly taking into account occlusions. After running a black-box autonomy system with modified sensor data as input, the scenario-generation system obtains the planned trajectory and evaluate how adversarial the scenario was. An adversarial actor captures multiple factors such as collisions, violations in traffic rules, and uncomfortable driving behaviors.

Aspects of the present disclosure improve the performance of an autonomous vehicle (AV) by improving the performance of the AV operations in various scenarios. Additionally, techniques described herein provide several technical improvements to simulation, robotics, and autonomous vehicle technology. To help improve the performance of a robotic platform, such as an autonomous vehicle, the technology of the present disclosure improves the motion of a robot by accurately determining trajectory of objects around the robot in unforeseen events and ensuring that the robot's trajectory maneuvers effectively. With regards to improvements in model training, the techniques described herein improve the testing of traffic scenarios by generating scalable large-scale driving datasets without requiring human input to generate the datasets. With regards to improvements in model inference, the techniques described herein improve the experience of individuals inside the AV, improve the experience of objects (e.g., pedestrians, other vehicles) around the AV, reducing energy consumption by optimizing the motion plan of the AV, improving drivability of the AV by reducing the jerkiness of the AV, and other vehicle driving parameters.

As an example, aspects of the present disclosure describe a method for generating testing data for an autonomous vehicle. The method includes obtaining sensor data descriptive of a traffic scenario. The traffic scenario includes a subject vehicle and one or more actors in an environment of the subject vehicle. Additionally, the method includes generating a perturbed trajectory for a first actor of the one or more actors in the environment based on one or more perturbation values. Moreover, the method includes generating simulated sensor data. The sensor data includes data descriptive of the perturbed trajectory for the first actor in the environment. Also, the method includes providing the simulated sensor data as input to an autonomous vehicle control system configured to process the simulated sensor data to generate an updated trajectory for the subject vehicle in the environment. Furthermore, the method includes evaluating an adversarial loss function based on the updated trajectory for the subject vehicle to generate an adversarial loss value.

In some implementations, the adversarial loss function includes one or more of the following: an imitation-learning cost term that encourages the updated trajectory to deviate from an original trajectory of the subject vehicle in the traffic scenario; a cumulative collision cost term that encourages the perturbation values to cause the subject vehicle to collide with the one or more actors; and a comfort cost term that encourages the updated trajectory to have lane violations, high acceleration, or jerk.

In some implementations, the generation of the perturbed trajectory for a first actor further includes generating a defined perturbation search space. Additionally, the method includes selecting the one or more perturbation values from the defined perturbation search space by using a black-box optimization technique. Moreover, the perturbed trajectory for the first actor is generated based on the selection of the one or more perturbation values.

In some implementations, the generation of the perturbed trajectory for a first actor further includes selecting the one or more perturbation values with an objective of optimizing (e.g., maximizing) an adversarial loss value provided by the adversarial loss function. Additionally, the perturbation search space includes initial state values and a set of change in curvatures and acceleration values over a number of timesteps.

In some implementations, the generation of the perturbed trajectory for a first actor further includes selecting the one or more perturbation values from a defined perturbation search space based at least in part on a set of historical observations associated with previously selected perturbation values. Additionally, the method further includes adding the one or more perturbation values and the adversarial loss value to the set of historical observations. Subsequently, the method includes obtaining sensor data descriptive of the traffic scenario; generating a perturbed trajectory for a first actor of the one or more actors in the environment based on one or more perturbation values; generating simulated sensor data; and providing the simulated sensor data as input to an autonomous vehicle control system configured to process the simulated sensor data to generate an updated trajectory for the subject vehicle in the environment.

In some implementations, the perturbed trajectory is parameterized as a series of kinematic bicycle model states.

In some implementations, the autonomous vehicle control system is a simulated AV control system.

In some implementations, the generation of the perturbed trajectory for a first actor further includes selecting a closest reachable actor as the first actor.

In some implementations, the generation of the perturbed trajectory for a first actor further includes creating a set of physically feasible trajectories for the first actor; generating an initial perturbed trajectory for the first actor based on the one or more perturbation values; and projecting the initial perturbed trajectory onto the set of physically feasible trajectories to generate the perturbed trajectory.

In some implementations, the generation of the perturbed trajectory for a first actor further includes ensuring that the perturbed trajectory avoids collision with: (i) one or more existing trajectories of one or more other actors in the environment; or (ii) an initial trajectory for the subject vehicle in the environment.

In some implementations, the sensor data includes light detection and ranging (LiDAR) data and the simulated sensor data includes simulated LiDAR data. Additionally, the method further includes removing LiDAR points within a bounding box associated with the first actor. Moreover, the method includes simulating new background LiDAR points after removing the LiDAR points within the bounding box. Furthermore, the method includes inserting simulated LiDAR points based on the perturbed trajectory for the first actor and removing LiDAR points included within a synthesized LiDAR shadow for one or more occluded regions based on the perturbed trajectory for the first actor.

In some implementations, the sensor data includes real-world sensor data previously collected by one or more physical sensors in the environment.

In some implementations, the autonomous vehicle control system includes one or more machine-learned models. The method further includes updating one or more values of one or more parameters of the one or more machine-learned models based on the adversarial loss function.

In some implementations, the generation of the perturbed trajectory for a first actor further includes performing a black-box optimization technique to select the one or more perturbation values from the defined perturbation search space. The black-box optimization technique includes one of the following: Bayesian optimization; a genetic algorithm; random search; or a gradient estimation method.

In some implementations, the autonomous vehicle control system includes one of the following: an end-to-end imitation learning system; a neural motion planner; a jointly learnable behavior and trajectory planning system; or a perceive, predict, and plan system.

As another example, aspects of the present disclosure describe a computing system that includes one or more processors and one or more computer-readable medium. The one or more computer-readable medium stores instructions that when executed by the one or more processors cause the computing system to perform operations. The operations include obtaining sensor data descriptive of a traffic scenario. The traffic scenario includes a subject vehicle and one or more actors in an environment. Additionally, the operations include selecting one or more perturbation values from a defined perturbation search space. Moreover, the operations include generating an adversarial trajectory for a first actor of the one or more actors in the environment based on the one or more perturbation values. Furthermore, the operations include generating simulated sensor data descriptive of the adversarial trajectory for the first actor in the environment.

In some implementations, the selection of the one or more perturbation values from the defined perturbation search space includes selecting the one or more perturbation values from the defined perturbation search space based at least in part on a set of historical observations associated with previously selected perturbation values. Additionally, the operations performed by the computing system further include providing the simulated sensor data as input to an autonomous vehicle control system configured to process the simulated sensor data to generate an updated trajectory for the subject vehicle in the environment. Moreover, the operations further include evaluating an adversarial loss function based on the updated trajectory for the subject vehicle to generate an adversarial loss value. Furthermore, the operations further include adding the one or more perturbation values and the adversarial loss value to the set of historical observations. Subsequent to adding the values to the set of historical observations, the operations further include repeating the obtaining the sensor data, selecting the perturbation values, generating the adversarial trajectory, and generating the simulated sensor data operations.

As yet another example, aspects of the present disclosure describe an autonomous vehicle control system including one or more machine-learned models. The one or more machine-learned models have been learned via performance of machine learning algorithms on one or more training examples including simulated sensor data. The simulated sensor data having been generated by performance of operations. The operations include obtaining sensor data descriptive of a traffic scenario. The traffic scenario includes a subject vehicle and one or more actors in an environment. Additionally, the operations include selecting one or more perturbation values from a defined perturbation search space. Moreover, the operations include generating an adversarial trajectory for a first actor of the one or more actors in the environment based on the one or more perturbation values. Furthermore, the operations include generating simulated sensor data descriptive of the adversarial trajectory for the first actor in the environment.

Other example aspects of the present disclosure are directed to other systems, methods, vehicles, apparatuses, tangible non-transitory computer-readable media, and devices for generating data (e.g., hybrid graphs), training models, and performing other functions (e.g., predicting interactions between objects, predicting a trajectory or motion of an object) described herein. These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which refers to the appended figures, in which.

DETAILED DESCRIPTION

Figure 1:
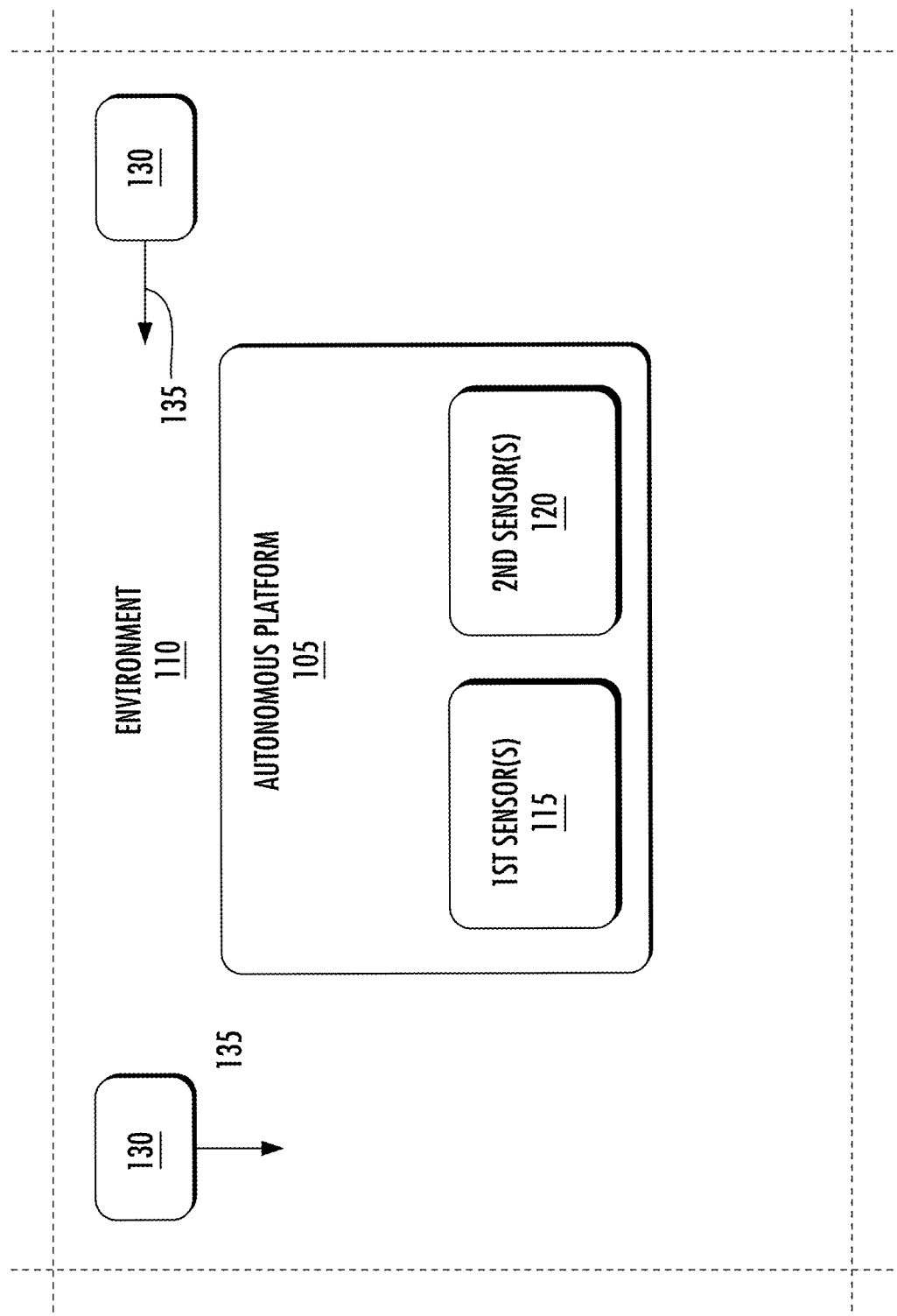
FIG. 1 is a block diagram of a computing platform, according to some implementations of the present disclosure.

The following describes the technology of this disclosure within the context of an autonomous vehicle for example purposes only. As described herein, the technology described herein is not limited to an autonomous vehicle and can be implemented within other robotic and computing systems. With reference now to FIGS. 1-9, example embodiments of the present disclosure will be discussed in further detail.

Autonomous systems (e.g., autonomous vehicles, subject vehicles) are applications in which comprehensive testing is often desirable before real-world deployment. As the performance of autonomous vehicles (e.g., subject vehicles) improves for foreseeable scenarios, it becomes important to test the autonomous vehicles in unlikely scenarios, such as where the autonomous vehicle may be challenged or ultimately fail one or more performance criteria. However, exhaustively searching over all possible scenarios can be computationally unfeasible, because there are exponentially numerous scenario variations due to the combinatorial number of possible lane topologies, actor configurations, trajectories, velocity profiles, appearance of actors and background, and so on.

In conventional systems, comprehensive testing can rely on human expertise to create an initial scenario set, where each scenario contains just a few actors (e.g., vehicles that interact with the AV's planned path) with specified initial locations and trajectories. Scenario variations are then programmatically created by varying the location and velocity profiles of the actors. These scenarios only evaluate simple interactions with the AV and do not test complex multi-actor interactions, such as lane-merging, unprotected left-turns in dense traffic scenes, or other interactions that the AV may encounter. Moreover, human involvement makes the conventional testing process time-consuming and difficult to scale. Furthermore, manual design can result in missing testing configurations that identify unexpected failure modes, as it can be difficult to assess coverage.

Additionally, conventional testing systems may not be able to generate adversarial scenarios when the environment includes actors that are hard to identify due to occlusion, or the trajectory plans for the actors are difficult to localize and forecast. Such issues in the perception and motion forecasting modules of the autonomy system can generate compounding errors that ultimately cause planning failures.

In contrast, embodiments of the present disclosure can generate complex and realistic traffic scenarios at scale for the AV testing system. In some implementations, the testing system can generate worst-case scenarios as a black box adversarial attack that can test any LiDAR-based autonomy system. The testing system can determine adversarial perturbations with respect to physically feasible changes in actor behavior, since such perturbations provide insight into the different types of driving situations that are challenging.

According to some embodiments, the testing system leverages real world traffic scenarios, which can be obtained from standard self-driving datasets, and optimize the trajectories of the actors to increase the risk of an autonomy system failure. Additionally, as the perturbation modifies the trajectories of the actors, the sensor data can be adjusted to accurately reflect the new state (e.g., velocity, location) of the actors. The testing system can use a high-fidelity LiDAR simulator that modifies the sensor data accordingly, while also taking into account occlusions. After running the black-box autonomy system with modified sensor data as input, the testing system generates the planned trajectory based on the modified sensor data. An adversarial module of the testing system evaluates the updated scenario to determine an adversarial value. The adversarial module captures multiple performance factors such as collisions, violations in traffic rules, uncomfortable driving behaviors, and so on. The testing system demonstrates flexibility and scalability by generating thousands of adversarial scenarios for a wide range of modern autonomy systems. Finally, the testing system can leverage generated traffic scenarios in training and further improve the performance of autonomy systems.

The autonomy systems can be separated into a plurality of sequential subtasks, such as object detection (e.g., perception system), motion forecasting (e.g., prediction system), and motion planning (e.g., motion planning system). In conventional systems, these sequential subtasks are developed separately, and thus cannot correct compounding errors. In contrast, the testing system described herein can evaluate a wide range of autonomy systems, including modular and end-to-end interpretable ones. For example, end-to-end self-driving can use deeper network architectures, more informative sensor inputs, and scalable learning methods. Additionally, interpretable neural motion planners can maintain modularity and interpretability while enabling end-to-end learning.

With regards to generating simulation scenarios, the testing system can generate a scenario parameterization space to optimize and identify critical scenario parameters using a search algorithm, and test (e.g., evaluate) the autonomous system using an evaluation setting. The testing system can represent the behavior of actors as kinematic bicycle-model trajectories that allow for physical feasibility and fine-grained behavior control. The search algorithm utilized to identify scenarios that cause autonomy failure include, but is not limited to, policy gradient, Bayesian optimization, evolutionary algorithms, and variants of Monte Carlo sampling. The testing system can build a general scenario generation algorithm, benchmark a wide variety of black-box search algorithms, and provide insight into which search algorithms are effective. The testing system includes an end-to-end adversarial scenario generation system that takes into account failures of the full autonomy stack. Additionally, the testing system scales to datasets with diverse traffic patterns and map configurations.

FIG. 1 depicts a block diagram of an example operational scenario 100 according to example implementations of the present disclosure. The operational scenario 100 includes an autonomous platform 105 and an environment 110. The environment 110 can be external to the autonomous platform 105. The autonomous platform 105, for example, can operate within the environment 110. The environment 110 can include an indoor environment (e.g., within one or more facilities, etc.) or an outdoor environment. An outdoor environment, for example, can include one or more areas in the outside world such as, for example, one or more rural areas (e.g., with one or more rural travel ways, etc.), one or more urban areas (e.g., with one or more city travel ways, highways, etc.), one or more suburban areas (e.g., with one or more suburban travel ways, etc.), etc. An indoor environment, for example, can include environments enclosed by a structure such as a building (e.g., a service depot, manufacturing facility, etc.).

The environment 110 can include one or more dynamic object(s) 130 (e.g., actors, simulated objects, real-world objects, etc.). The dynamic object(s) 130 can include any number of moveable objects such as, for example, one or more pedestrians, animals, vehicles, etc. The dynamic object(s) 130 can move within the environment according to one or more trajectories 135. Although trajectories 135 are depicted as emanating from dynamic object(s) 130, it is also to be understood that relative motion within the environment 110 can include one or more trajectories of the autonomous platform 105 itself. For instance, aspects of the present disclosure relate to the generation of trajectories via a joint prediction/planning framework, and those trajectories can, in various implementations, take into account trajectories 135 of the dynamic object(s) 130 and/or one or more trajectories of the autonomous platform 105 itself.

The autonomous platform 105 can include one or more sensor(s) 115, 120. The one or more sensors 115, 120 can be configured to generate or store data descriptive of the environment 110 (e.g., one or more static or dynamic objects therein, etc.). The sensor(s) 115, 120 can include one or more LiDAR systems, one or more Radio Detection and Ranging (RADAR) systems, one or more cameras (e.g., visible spectrum cameras or infrared cameras, etc.), one or more sonar systems, one or more motion sensors, or other types of image capture devices or sensors. The sensor(s) 115, 120 can include multiple sensors of different types. For instance, the sensor(s) 115, 120 can include one or more first sensor(s) 115 and one or more second sensor(s) 120. The first sensor(s) 115 can include a different type of sensor than the second sensor(s) 120. By way of example, the first sensor(s) 115 can include one or more imaging device(s) (e.g., cameras, etc.), whereas the second sensor(s) 120 can include one or more depth measuring device(s) (e.g., LiDAR device, etc.).

The autonomous platform 105 can include any type of platform configured to operate within the environment 110. For example, the autonomous platform 105 can include one or more different type(s) of vehicle(s) configured to perceive and operate within the environment 110. The vehicles, for example, can include one or more autonomous vehicle(s) such as, for example, one or more autonomous trucks. By way of example, the autonomous platform 105 can include an autonomous truck, including an autonomous tractor coupled to a cargo trailer. In addition, or alternatively, the autonomous platform 105 can include any other type of vehicle such as one or more aerial vehicles, ground-based vehicles, water-based vehicles, space-based vehicles, etc.

Figure 2:
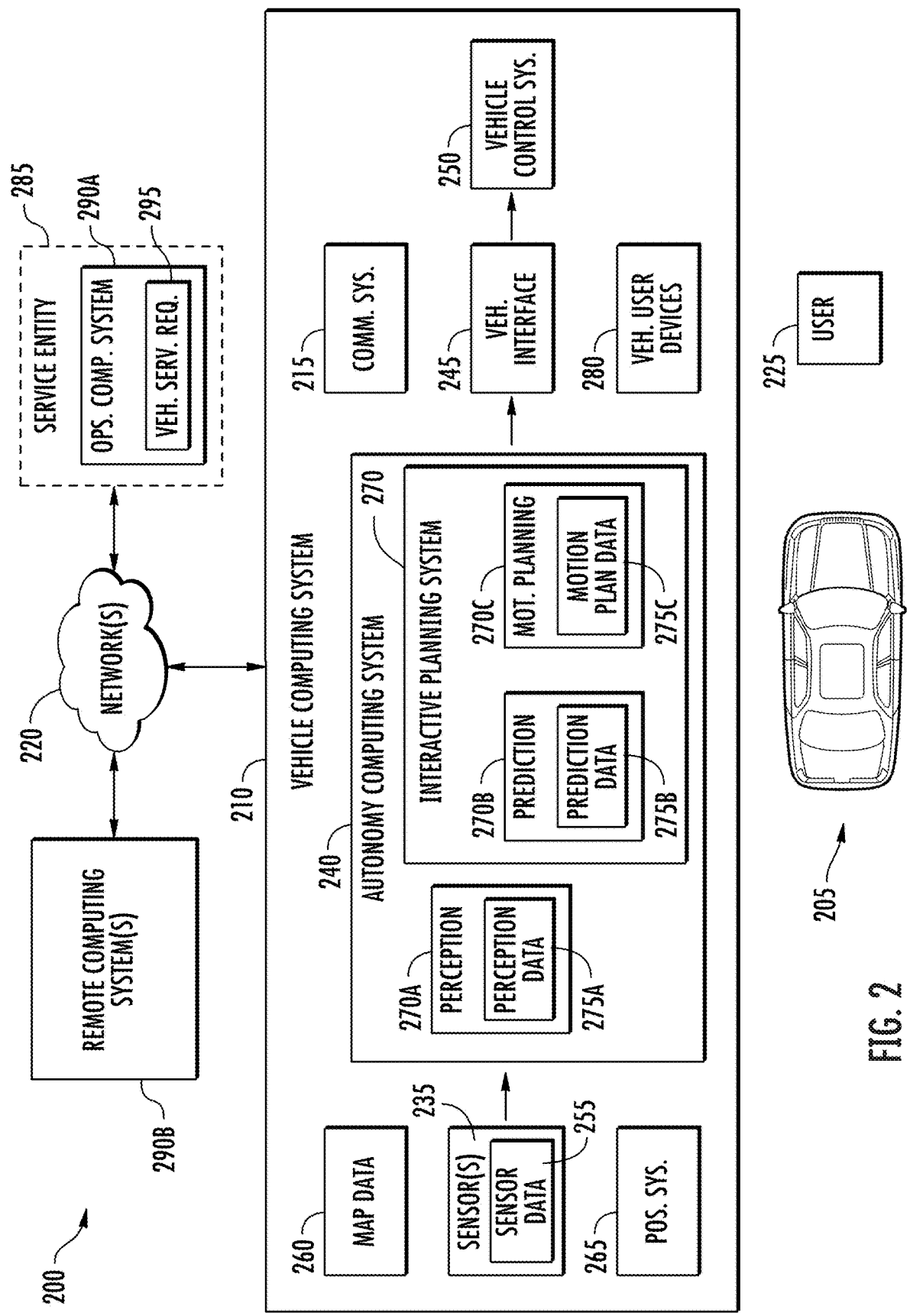
FIG. 2 is a block diagram of a system, according to some implementations of the present disclosure.

FIG. 2 depicts an example system overview 200 of the autonomous platform as an autonomous vehicle (e.g., subject vehicle) according to example implementations of the present disclosure. The system overview 200 can be of an autonomous system. More particularly, FIG. 2 illustrates a vehicle 205 including various systems and devices configured to control the operation of the vehicle 205. For example, the vehicle 205 (e.g., subject vehicle) can include an onboard vehicle computing system 210 (e.g., located on or within the autonomous vehicle, etc.) that is configured to operate the vehicle 205. For example, the vehicle computing system 210 can represent or be an autonomous vehicle control system configured to perform the operations and functions described herein for joint prediction/planning of trajectories. Generally, the vehicle computing system 210 can obtain sensor data 255 from sensor(s) 235 (e.g., sensor(s) 115, 120 of FIG. 1, etc.) onboard the vehicle 205, attempt to comprehend the vehicle's surrounding environment by performing various processing techniques on the sensor data 255, and generate an appropriate motion plan through the vehicle's surrounding environment (e.g., environment 110 of FIG. 1, etc.).

The vehicle 205 incorporating the vehicle computing system 210 can be various types of vehicles. For instance, the vehicle 205 can be an autonomous vehicle. The vehicle 205 can be a ground-based autonomous vehicle (e.g., car, truck, bus, etc.). The vehicle 205 can be an air-based autonomous vehicle (e.g., airplane, helicopter, etc.). The vehicle 205 can be a lightweight electric vehicle (e.g., bicycle, scooter, etc.). The vehicle 205 can be another type of vehicle (e.g., watercraft, etc.). The vehicle 205 can drive, navigate, operate, etc. with minimal or no interaction from a human operator (e.g., driver, pilot, etc.). In some implementations, a human operator can be omitted from the vehicle 205 (or also omitted from remote control of the vehicle 205). In some implementations, a human operator can be included in the vehicle 205.

The vehicle 205 can be configured to operate in a plurality of operating modes. The vehicle 205 can be configured to operate in a fully autonomous (e.g., self-driving, etc.) operating mode in which the vehicle 205 is controllable without user input (e.g., can drive and navigate with no input from a human operator present in the vehicle 205 or remote from the vehicle 205, etc.). The vehicle 205 can operate in a semi-autonomous operating mode in which the vehicle 205 can operate with some input from a human operator present in the vehicle 205 (or a human operator that is remote from the vehicle 205). The vehicle 205 can enter into a manual operating mode in which the vehicle 205 is fully controllable by a human operator (e.g., human driver, pilot, etc.) and can be prohibited or disabled (e.g., temporary, permanently, etc.) from performing autonomous navigation (e.g., autonomous driving, flying, etc.). The vehicle 205 can be configured to operate in other modes such as, for example, park or sleep modes (e.g., for use between tasks/actions such as waiting to provide a vehicle service, recharging, etc.). In some implementations, the vehicle 205 can implement vehicle operating assistance technology (e.g., collision mitigation system, power assist steering, etc.), for example, to help assist the human operator of the vehicle 205 (e.g., while in a manual mode, etc.).

To help maintain and switch between operating modes, the vehicle computing system 210 can store data indicative of the operating modes of the vehicle 205 in a memory onboard the vehicle 205. For example, the operating modes can be defined by an operating mode data structure (e.g., rule, list, table, etc.) that indicates one or more operating parameters for the vehicle 205, while in the particular operating mode. For example, an operating mode data structure can indicate that the vehicle 205 is to autonomously plan its motion when in the fully autonomous operating mode. The vehicle computing system 210 can access the memory when implementing an operating mode.

The operating mode of the vehicle 205 can be adjusted in a variety of manners. For example, the operating mode of the vehicle 205 can be selected remotely, off-board the vehicle 205. For example, a remote computing system (e.g., of a vehicle provider, fleet manager, or service entity associated with the vehicle 205, etc.) can communicate data to the vehicle 205 instructing the vehicle 205 to enter into, exit from, maintain, etc. an operating mode. By way of example, such data can instruct the vehicle 205 to enter into the fully autonomous operating mode.

In some implementations, the operating mode of the vehicle 205 can be set onboard or near the vehicle 205. For example, the vehicle computing system 210 can automatically determine when and where the vehicle 205 is to enter, change, maintain, etc. a particular operating mode (e.g., without user input, etc.). Additionally, or alternatively, the operating mode of the vehicle 205 can be manually selected through one or more interfaces located onboard the vehicle 205 (e.g., key switch, button, etc.) or associated with a computing device within a certain distance to the vehicle 205 (e.g., a tablet operated by authorized personnel located near the vehicle 205 and connected by wire or within a wireless communication range, etc.). In some implementations, the operating mode of the vehicle 205 can be adjusted by manipulating a series of interfaces in a particular order to cause the vehicle 205 to enter into a particular operating mode.

The operations computing system 290A can include multiple components for performing various operations and functions. For example, the operations computing system 290A can be configured to monitor and communicate with the vehicle 205 or its users. This can include overseeing the vehicle 205 and/or coordinating a vehicle service provided by the vehicle 205 (e.g., cargo delivery service, passenger transport, etc.). To do so, the operations computing system 290A can communicate with the one or more remote computing system(s) 290B or the vehicle 205 through one or more communications network(s) including the communications network(s) 220. The communications network(s) 220 can send or receive signals (e.g., electronic signals, etc.) or data (e.g., data from a computing device, etc.) and include any combination of various wired (e.g., twisted pair cable, etc.) or wireless communication mechanisms (e.g., cellular, wireless, satellite, microwave, and radio frequency, etc.) or any desired network topology (or topologies). For example, the communications network 220 can include a local area network (e.g., intranet, etc.), wide area network (e.g., the Internet, etc.), wireless LAN network (e.g., through Wi-Fi, etc.), cellular network, a SATCOM network, VHF network, a HF network, a WiMAX based network, or any other suitable communications network (or combination thereof) for transmitting data to or from the vehicle 205.

Each of the one or more remote computing system(s) 290B or the operations computing system 290A can include one or more processors and one or more memory devices. The one or more memory devices can be used to store instructions that when executed by the one or more processors of the one or more remote computing system(s) 290B or operations computing system 290A cause the one or more processors to perform operations or functions including operations or functions associated with the vehicle 205 including sending or receiving data or signals to or from the vehicle 205, monitoring the state of the vehicle 205, or controlling the vehicle 205. The one or more remote computing system(s) 290B can communicate (e.g., exchange data or signals, etc.) with one or more devices including the operations computing system 290A and the vehicle 205 through the communications network(s) 220.

The one or more remote computing system(s) 290B can include one or more computing devices such as, for example, one or more devices associated with a service entity (e.g., coordinating and managing a vehicle service), one or more operator devices associated with one or more vehicle providers (e.g., providing vehicles for use by the service entity, etc.), user devices associated with one or more vehicle passengers, developer devices associated with one or more vehicle developers (e.g., a laptop/tablet computer configured to access computer software of the vehicle computing system 210, etc.), or other devices. One or more of the devices can receive input instructions from a user or exchange signals or data with an item or other computing device or computing system (e.g., the operations computing system 290A, etc.). Further, the one or more remote computing system(s) 290B can be used to determine or modify one or more states of the vehicle 205 including a location (e.g., a latitude and longitude, etc.), a velocity, an acceleration, a trajectory, a heading, or a path of the vehicle 205 based in part on signals or data exchanged with the vehicle 205. In some implementations, the operations computing system 290A can include the one or more remote computing system(s) 290B.

The vehicle computing system 210 can include one or more computing devices located onboard the vehicle 205. For example, the computing device(s) can be located on or within the vehicle 205. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 205 (e.g., its computing system, one or more processors, etc.) to perform operations and functions, such as those described herein for collecting and processing sensor data, performing autonomy functions, predicting object trajectories and generating vehicle motion trajectories (e.g., using a joint prediction/planning framework according to example aspects of the present disclosure), controlling the vehicle 205, communicating with other computing systems, etc.

The vehicle 205 can include a communications system 215 configured to allow the vehicle computing system 210 (and its computing device(s)) to communicate with other computing devices. The communications system 215 can include any suitable components for interfacing with one or more network(s) 220, including, for example, transmitters, receivers, ports, controllers, antennas, or other suitable components that can help facilitate communication. In some implementations, the communications system 215 can include a plurality of components (e.g., antennas, transmitters, or receivers, etc.) that allow it to implement and utilize multiple-input, multiple-output (MIMO) technology and communication techniques. The vehicle computing system 210 can use the communications system 215 to communicate with one or more computing devices that are remote from the vehicle 205 over the communication network(s) 220 (e.g., through one or more wireless signal connections, etc.).

As shown in FIG. 2, the vehicle computing system 210 can include the one or more sensors 235, the autonomy computing system 240, the vehicle interface 245, the one or more vehicle control systems 250, and other systems, as described herein. One or more of these systems can be configured to communicate with one another through one or more communication channels. The communication channel(s) can include one or more data buses (e.g., controller area network (CAN), etc.), on-board diagnostics connector (e.g., OBD-II, etc.), or a combination of wired or wireless communication links. The onboard systems can send or receive data, messages, signals, etc. amongst one another through the communication channel(s).

In some implementations, the sensor(s) 235 can include one or more LiDAR sensor(s). The sensor(s) 235 can be configured to generate point data descriptive of a portion of a three-hundred-and-sixty-degree view of the surrounding environment. In some instances, the sensor(s) 235 can be configured to generate simulated sensor data, such as simulated three-dimensional LiDAR point cloud data. In some implementations, one or more sensors 235 for capturing depth information can be fixed to a rotational device in order to rotate the sensor(s) about an axis. The sensor(s) 235 can be rotated about the axis while capturing data in interval sector packets descriptive of different portions of a three-hundred-and-sixty-degree view of a surrounding environment of the vehicle 205. In some implementations, one or more sensors 235 for capturing depth information can be solid state.

In some implementations, the sensor(s) 235 can include at least two different types of sensor(s). For instance, the sensor(s) 235 can include at least one first sensor (e.g., the first sensor(s) 115, etc.) and at least one second sensor (e.g., the second sensor(s) 120, etc.). The at least one first sensor can be a different type of sensor than the at least one second sensor. For example, the at least one first sensor can include one or more image capturing device(s) (e.g., one or more cameras, RGB cameras, etc.). In addition, or alternatively, the at least one second sensor can include one or more depth capturing device(s) (e.g., LiDAR sensor, etc.). The at least two different types of sensor(s) can obtain multi-modal sensor data indicative of one or more static or dynamic objects within an environment of the vehicle 205.

The sensor(s) 235 can be configured to acquire sensor data 255 or generate sensor data 255 (e.g., simulated sensor data). The sensor(s) 235 can be external sensors configured to acquire external sensor data. This can include sensor data associated with the surrounding environment of the vehicle 205. The surrounding environment of the vehicle 205 can include/be represented in the field of view of the sensor(s) 235. For instance, the sensor(s) 235 can acquire image or other data of the environment outside of the vehicle 205 and within a range or field of view of one or more of the sensor(s) 235. This can include different types of sensor data acquired by the sensor(s) 235 such as, for example, data from one or more LiDAR systems, one or more RADAR systems, one or more cameras (e.g., visible spectrum cameras, infrared cameras, etc.), one or more motion sensors, one or more audio sensors (e.g., microphones, etc.), or other types of imaging capture devices or sensors. The sensor data 255 can include image data (e.g., 2D camera data, video data, etc.), RADAR data, LiDAR data (e.g., 3D point cloud data, etc.), audio data, or other types of data. In addition, or alternatively, the sensor data 255 can include simulated image data (e.g., simulated 2D camera data, simulated video data, etc.), simulated RADAR data, simulated LiDAR data (e.g., simulated 3D point cloud data, etc.), simulated audio data, or other types of simulated data. The one or more sensors can be located on various parts of the vehicle 205 including a front side, rear side, left side, right side, top, or bottom of the vehicle 205. The vehicle 205 can also include other sensors configured to acquire data associated with the vehicle 205 itself. For example, the vehicle 205 can include inertial measurement unit(s), wheel odometry devices, or other sensors.

The sensor data 255 can be indicative of one or more objects within the surrounding environment of the vehicle 205. The object(s) can include, for example, vehicles, pedestrians, bicycles, or other objects. The object(s) can be located in front of, to the rear of, to the side of, above, below the vehicle 205, etc. The sensor data 255 can be indicative of locations associated with the object(s) within the surrounding environment of the vehicle 205 at one or more times. The object(s) can be static objects (e.g., not in motion, etc.) or dynamic objects, such as other objects (e.g., in motion or likely to be in motion, etc.) in the vehicle's environment, such as people, animals, machines, vehicles, etc. The sensor data 255 can also be indicative of the static background of the environment. The sensor(s) 235 can provide the sensor data 255 to the autonomy computing system 240, the remote computing device(s) 290B, or the operations computing system 290A.

In addition to the sensor data 255, the autonomy computing system 240 can obtain map data 260. The map data 260 can provide detailed information about the surrounding environment of the vehicle 205 or the geographic area in which the vehicle 205 was, is, or will be located. For example, the map data 260 can provide information regarding: the identity and location of different roadways, road segments, buildings, or other items or objects (e.g., lampposts, crosswalks or curb, etc.); the location and directions of traffic lanes (e.g., the location and direction of a parking lane, a turning lane, a bicycle lane, or other lanes within a particular roadway or other travel way or one or more boundary markings associated therewith, etc.); traffic control data (e.g., the location and instructions of signage, traffic lights, or other traffic control devices, etc.); obstruction information (e.g., temporary or permanent blockages, etc.); event data (e.g., road closures/traffic rule alterations due to parades, concerts, sporting events, etc.); nominal vehicle path data (e.g., indicate of an ideal vehicle path such as along the center of a certain lane, etc.); or any other map data that provides information that assists the vehicle computing system 210 in processing, analyzing, and perceiving its surrounding environment and its relationship thereto. In some implementations, the map data 260 can include high-definition map data. In some implementations, the map data 260 can include sparse map data indicative of a limited number of environmental features (e.g., lane boundaries, etc.). In some implementations, the map data can be limited to geographic area(s) or operating domains in which the vehicle 205 (or autonomous vehicles generally) can travel (e.g., due to legal/regulatory constraints, autonomy capabilities, or other factors, etc.).

The vehicle 205 can include a positioning system 265. The positioning system 265 can determine a current position of the vehicle 205. This can help the vehicle 205 localize itself within its environment. The positioning system 265 can be any device or circuitry for analyzing the position of the vehicle 205. For example, the positioning system 265 can determine position by using one or more of inertial sensors (e.g., inertial measurement unit(s), etc.), a satellite positioning system, based on IP address, by using triangulation or proximity to network access points or other network components (e.g., cellular towers, Wi-Fi access points, etc.) or other suitable techniques. The position of the vehicle 205 can be used by various systems of the vehicle computing system 210 or provided to a remote computing system. For example, the map data 260 can provide the vehicle 205 relative positions of the elements of a surrounding environment of the vehicle 205. The vehicle 205 can identify its position within the surrounding environment (e.g., across six axes, etc.) based at least in part on the map data 260. For example, the vehicle computing system 210 can process the sensor data 255 (e.g., LiDAR data, camera data, etc.) to match it to a map of the surrounding environment to get an understanding of the vehicle's position within that environment. Data indicative of the vehicle's position can be stored, communicated to, or otherwise obtained by the autonomy computing system 240.

The autonomy computing system 240 can perform various functions for autonomously operating the vehicle 205. For example, the autonomy computing system 240 can perform the following functions: perception 270A, prediction/forecasting 270B, and motion planning 270C. For example, the autonomy computing system 240 can obtain the sensor data 255 through the sensor(s) 235, process the sensor data 255 (or other data) to perceive its surrounding environment, predict the motion of objects within the surrounding environment, and generate an appropriate motion plan through such surrounding environment. In some implementations, these autonomy functions can be performed by one or more sub-systems such as, for example, a perception system, a prediction/forecasting system, a motion planning system, or other systems that cooperate to perceive the surrounding environment of the vehicle 205 and determine a motion plan for controlling the motion of the vehicle 205 accordingly. In some implementations, one or more of the perception, prediction, or motion planning functions 270A, 270B, 270C can be performed by (or combined into) the same system or through shared computing resources. In some implementations, one or more of these functions can be performed through different sub-systems. As further described herein, the autonomy computing system 240 can communicate with the one or more vehicle control systems 250 to operate the vehicle 205 according to the motion plan (e.g., through the vehicle interface 245, etc.).

For example, in some implementations, the autonomy computing system 240 can contain an interactive planning system 270 for joint planning/prediction according to example aspects of the present disclosure. Interactive planning system 270 can be included as an addition or complement to one or more traditional planning system(s). For instance, in some implementations, the interactive planning system 270 can implement prediction and motion planning functions 270B and 270C, while optionally one or more other planning systems can implement other prediction and motion planning functions (e.g., noninteractive functions). In some implementations, prediction and motion planning functions 270B and 270C can be implemented jointly to provide for interactive motion planning (e.g., motion planning for vehicle 205 that accounts for predicted interactions of other objects (e.g., objects 130 of FIG. 1) with the motion plans, etc.). In some implementations, however, interactive planning system 270 can be configured to provide noninteractive planning (e.g., optionally in addition to interactive planning). In some implementations, interactive planning system 270 can be configured with variable interactivity, such that the output(s) of interactive planning system 270 can be adjusted to fully interactive planning, fully noninteractive planning, and one or more configurations therebetween (e.g., interactive planning aspects in a weighted combination with noninteractive planning aspects, etc.).

The vehicle computing system 210 (e.g., the autonomy computing system 240, etc.) can identify one or more objects that are within the surrounding environment of the vehicle 205 based at least in part on the sensor data 255 or the map data 260. The objects perceived within the surrounding environment can be those within the field of view of the sensor(s) 235 or predicted to be occluded from the sensor(s) 235. This can include object(s) not in motion or not predicted to move (static objects) or object(s) in motion or predicted to be in motion (dynamic objects/actors). The vehicle computing system 210 (e.g., performing the perception function 270A, using a perception system, etc.) can process the sensor data 255, the map data 260, etc. to obtain perception data 275A. The vehicle computing system 210 can generate perception data 275A that is indicative of one or more states (e.g., current or past state(s), etc.) of one or more objects that are within a surrounding environment of the vehicle 205. For example, the perception data 275A for each object can describe (e.g., for a given time, time period, etc.) an estimate of the object's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The vehicle computing system 210 can utilize one or more algorithms or machine-learned model(s) that are configured to identify object(s) based at least in part on the sensor data 255. This can include, for example, one or more neural networks trained to identify object(s) within the surrounding environment of the vehicle 205 and the state data associated therewith. The perception data 275A can be utilized for the prediction function 270B of the autonomy computing system 240.

The vehicle computing system 210 can be configured to predict a motion of the object(s) within the surrounding environment of the vehicle 205. For instance, the vehicle computing system 210 can generate prediction data 275B associated with such object(s). The prediction data 275B can be indicative of one or more predicted future locations of each respective object. For example, the prediction function 270B can determine a predicted motion trajectory along which a respective object is predicted to travel over time. A predicted motion trajectory can be indicative of a path that the object is predicted to traverse and an associated timing with which the object is predicted to travel along the path. The predicted path can include or be made up of a plurality of waypoints. In some implementations, the prediction data 275B can be indicative of the speed or acceleration at which the respective object is predicted to travel along its associated predicted motion trajectory. The vehicle computing system 210 can utilize one or more algorithms and one or more machine-learned model(s) that are configured to predict the future motion of object(s) based at least in part on the sensor data 255, the perception data 275A, map data 260, or other data. This can include, for example, one or more neural networks trained to predict the motion of the object(s) within the surrounding environment of the vehicle 205 based at least in part on the past or current state(s) of those objects as well as the environment in which the objects are located (e.g., the lane boundary in which it is travelling, etc.). The prediction data 275B can be utilized for the motion planning function 270C of the autonomy computing system 240, such as in a joint planning/prediction technique implemented by interactive planning system 270.

The vehicle computing system 210 can determine a motion plan for the vehicle 205 based at least in part on the perception data 275A, the prediction data 275B, or other data. For example, the vehicle computing system 210 can generate motion planning data 275C indicative of a motion plan. The motion plan can include vehicle actions (e.g., speed(s), acceleration(s), other actions, etc.) with respect to one or more of the objects within the surrounding environment of the vehicle 205 as well as the objects' predicted movements. The motion plan can include one or more vehicle motion trajectories that indicate a path for the vehicle 205 to follow. A vehicle motion trajectory can be of a certain length or time range. A vehicle motion trajectory can be defined by one or more waypoints (with associated coordinates). The waypoint(s) can be future location(s) for the vehicle 205. The planned vehicle motion trajectories can indicate the path the vehicle 205 is to follow as it traverses a route from one location to another. Thus, the vehicle computing system 210 can take into account a route/route data when performing the motion planning function 270C.

The vehicle computing system 210 can implement (e.g., via interactive planning system 270) an optimization algorithm, machine-learned model, etc. that considers cost data associated with a vehicle action as well as other objectives (e.g., cost functions, such as cost functions based at least in part on dynamic objects, speed limits, traffic lights, etc.), if any, to determine optimized variables that make up the motion plan. The vehicle computing system 210 can determine that the vehicle 205 can perform a certain action (e.g., pass an object, etc.) without increasing the potential risk to the vehicle 205 or violating any traffic laws (e.g., speed limits, lane boundaries, signage, etc.). For instance, the vehicle computing system 210 can evaluate the predicted motion trajectories of one or more objects during its cost data analysis to help determine an optimized vehicle trajectory through the surrounding environment. The motion planning function 270C can generate cost data associated with such trajectories. In some implementations, one or more of the predicted motion trajectories or perceived objects may not ultimately change the motion of the vehicle 205 (e.g., due to an overriding factor, etc.). In some implementations, the motion plan can define the vehicle's motion such that the vehicle 205 avoids the object(s), reduces speed to give more leeway to one or more of the object(s), proceeds cautiously, performs a stopping action, passes an object, queues behind/in front of an object, etc.

The vehicle computing system 210 can be configured to continuously update the vehicle's motion plan and corresponding planned vehicle motion trajectories. For example, in some implementations, the vehicle computing system 210 can generate new motion planning data 275C (e.g., motion plan(s)) for the vehicle 205 (e.g., multiple times per second, etc.). Each new motion plan can describe a motion of the vehicle 205 over the next planning period (e.g., waypoint(s)/locations(s) over the next several seconds, etc.). Moreover, a motion plan can include a planned vehicle motion trajectory. The motion trajectory can be indicative of the future planned location(s), waypoint(s), heading, velocity, acceleration, etc. In some implementations, the vehicle computing system 210 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 205.

The vehicle computing system 210 can cause the vehicle 205 to initiate a motion control in accordance with at least a portion of the motion planning data 275C. A motion control can be an operation, action, etc. that is associated with controlling the motion of the vehicle 205. For instance, the motion planning data 275C can be provided to the vehicle control system(s) 250 of the vehicle 205. The vehicle control system(s) 250 can be associated with a vehicle interface 245 that is configured to implement a motion plan. The vehicle interface 245 can serve as an interface/conduit between the autonomy computing system 240 and the vehicle control systems 250 of the vehicle 205 and any electrical/mechanical controllers associated therewith. The vehicle interface 245 can, for example, translate a motion plan into instructions for the appropriate vehicle control component (e.g., acceleration control, brake control, steering control, etc.). By way of example, the vehicle interface 245 can translate a determined motion plan into instructions to adjust the steering of the vehicle 205 by a certain number of degrees, apply a certain magnitude of braking force, increase/decrease speed, etc. The vehicle interface 245 can help facilitate the responsible vehicle control (e.g., braking control system, steering control system, acceleration control system, etc.) to execute the instructions and implement a motion plan (e.g., by sending control signal(s), making the translated plan available, etc.). This can allow the vehicle 205 to autonomously travel within the vehicle's surrounding environment.

The vehicle computing system 210 can store other types of data. For example, an indication, record, or other data indicative of the state of the vehicle (e.g., its location, motion trajectory, health information, etc.), the state of one or more users (e.g., passengers, operators, etc.) of the vehicle, or the state of an environment including one or more objects (e.g., the physical dimensions or appearance of the one or more objects, locations, predicted motion, etc.) can be stored locally in one or more memory devices of the vehicle 205. Additionally, the vehicle 205 can communicate data indicative of the state of the vehicle, the state of one or more passengers of the vehicle, or the state of an environment to a computing system that is remote from the vehicle 205, which can store such information in one or more memories remote from the vehicle 205. Moreover, the vehicle 205 can provide any of the data created or store onboard the vehicle 205 to another vehicle.

The vehicle computing system 210 can include or otherwise be in communication with the one or more vehicle user devices 280. For example, the vehicle computing system 210 can include, or otherwise be in communication with, one or more user devices with one or more display devices located onboard the vehicle 205. A display device (e.g., screen of a tablet, laptop, smartphone, etc.) can be viewable by a user of the vehicle 205 that is located in the front of the vehicle 205 (e.g., driver's seat, front passenger seat, etc.). Additionally, or alternatively, a display device can be viewable by a user of the vehicle 205 that is located in the rear of the vehicle 205 (e.g., a back passenger seat, etc.). The user device(s) associated with the display devices can be any type of user device such as, for example, a tablet, mobile phone, laptop, etc. The vehicle user device(s) 280 can be configured to function as human-machine interfaces. For example, the vehicle user device(s) 280 can be configured to obtain user input, which can then be utilized by the vehicle computing system 210 or another computing system (e.g., a remote computing system, etc.). For example, a user (e.g., a passenger for transportation service, a vehicle operator, etc.) of the vehicle 205 can provide user input to adjust a destination location of the vehicle 205. The vehicle computing system 210 or another computing system can update the destination location of the vehicle 205 and the route associated therewith to reflect the change indicated by the user input.

As described herein, with reference to the remaining figures, the autonomy computing system 240 can utilize one or more machine-learned models to perform the perception 270A, prediction 270B, or motion planning 270C functions. The machine-learned model(s) can be previously trained through one or more machine-learned techniques. The machine-learned models can be previously trained by the one or more remote computing system(s) 290B, the operations computing system 290A, or any other device (e.g., remote servers, training computing systems, etc.) remote from or onboard the vehicle 205. For example, the one or more machine-learned models can be learned by a training computing system over training data stored in a training database. The training data can include, for example, sequential sensor data indicative of an environment (and objects/features within) at different timesteps. In some implementations, the training data can include a plurality of environments previously recorded by the autonomous vehicle with one or more objects, static object(s) or dynamic object(s).

To help improve the performance of an autonomous platform, such as an autonomous vehicle of FIG. 2, the technology of the present disclosure generally provides for implementing an interactive planning system 270. In particular, example aspects of the present disclosure provide for a structured deep model (e.g., a structured machine-learned model) that uses a set of learnable costs across a set of future (e.g., possible) object trajectories. In some instances, the set of learnable costs can induce a joint probability distribution over the set of future object trajectories (e.g., a distribution of probabilities for each of the set of future object trajectories, such as a set of probabilities for each of the set of future object trajectories conditioned on the vehicle motion trajectory of the autonomous vehicle). In this manner, for example, the interactive planning system 270 can jointly predict object motion (e.g., using the probability information) and plan vehicle motion (e.g., according to the costs).

Figure 3A:
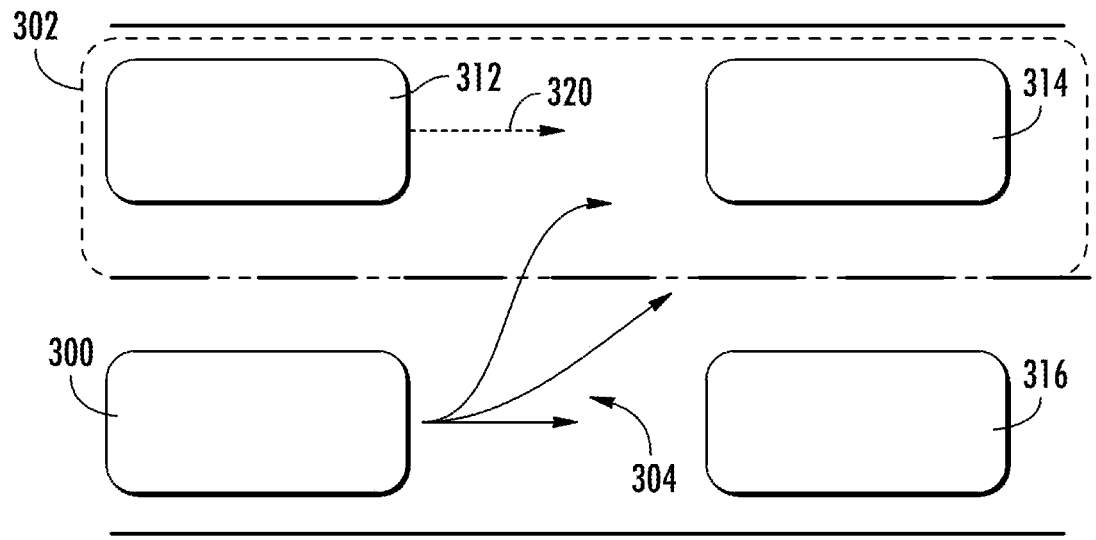
FIGS. 3A and 3B are a graphical depiction of a joint planning/prediction approach, according to some implementations of the present disclosure.
Figure 3B:
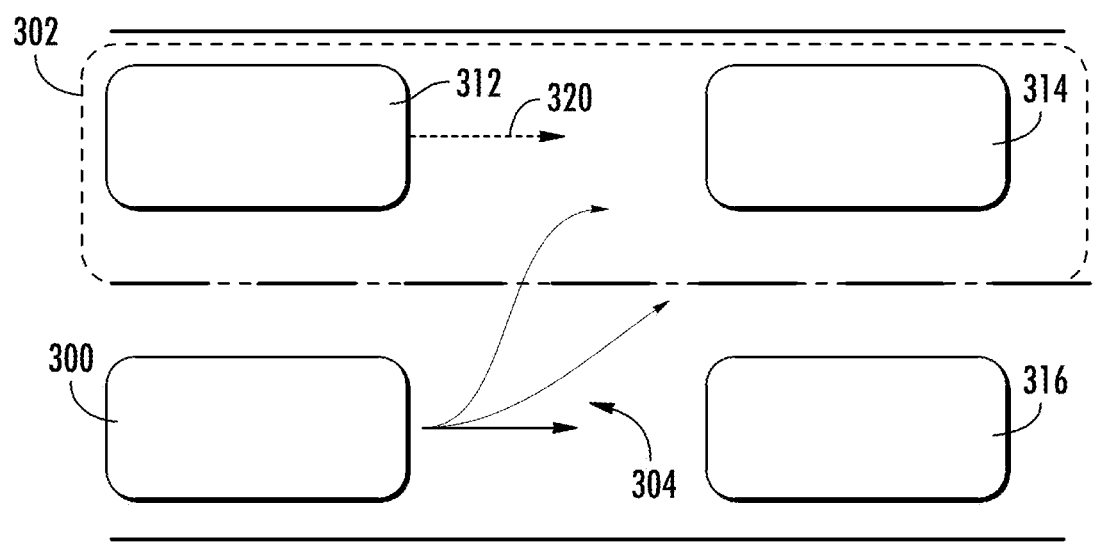

In some implementations, an interactive planning system 270 can implement interactive planning or noninteractive planning, as well as combinations thereof. For example, FIG. 3A illustrates an ego-actor, such as autonomous vehicle 300 (e.g., subject vehicle), traversing a lane of a roadway. It might be desired for the autonomous vehicle 300 to change lanes to move into the other lane 302 (e.g., by following one or more vehicle motion trajectories 304). However, the autonomous vehicle 300 is sharing the roadway with objects 312, 314, and 316 (e.g., other actors). And it can be predicted (e.g., by prediction function 270B) that object 312 will continue moving forward in lane 302 along object trajectory 320 and maintain the same distance behind object 314, which may not leave sufficient room for autonomous vehicle 300 to maneuver into lane 302 while meeting other constraints (e.g., buffer space constraints, etc.). Based on this prediction, for example, the autonomous vehicle 300 can choose one of the motion trajectories 304 that does not interfere with the object 312 on the object trajectory 320 (e.g., as illustrated in FIG. 3B).

In some scenarios, the other objects 312, 314, and 316, absent an external factor, might never move in such a way as to permit the autonomous vehicle 300 to ever obtain sufficient space (e.g., between objects 312 and 314) to change lanes. For instance, object 312 might never have any interaction with any motion of autonomous vehicle 300 (e.g., never cooperatively adapt to the motion of the autonomous vehicle 300). But in some scenarios, the object 312 might interact with a motion of the autonomous vehicle 300 in such a way as to open up space in the lane 302.

Figure 4:
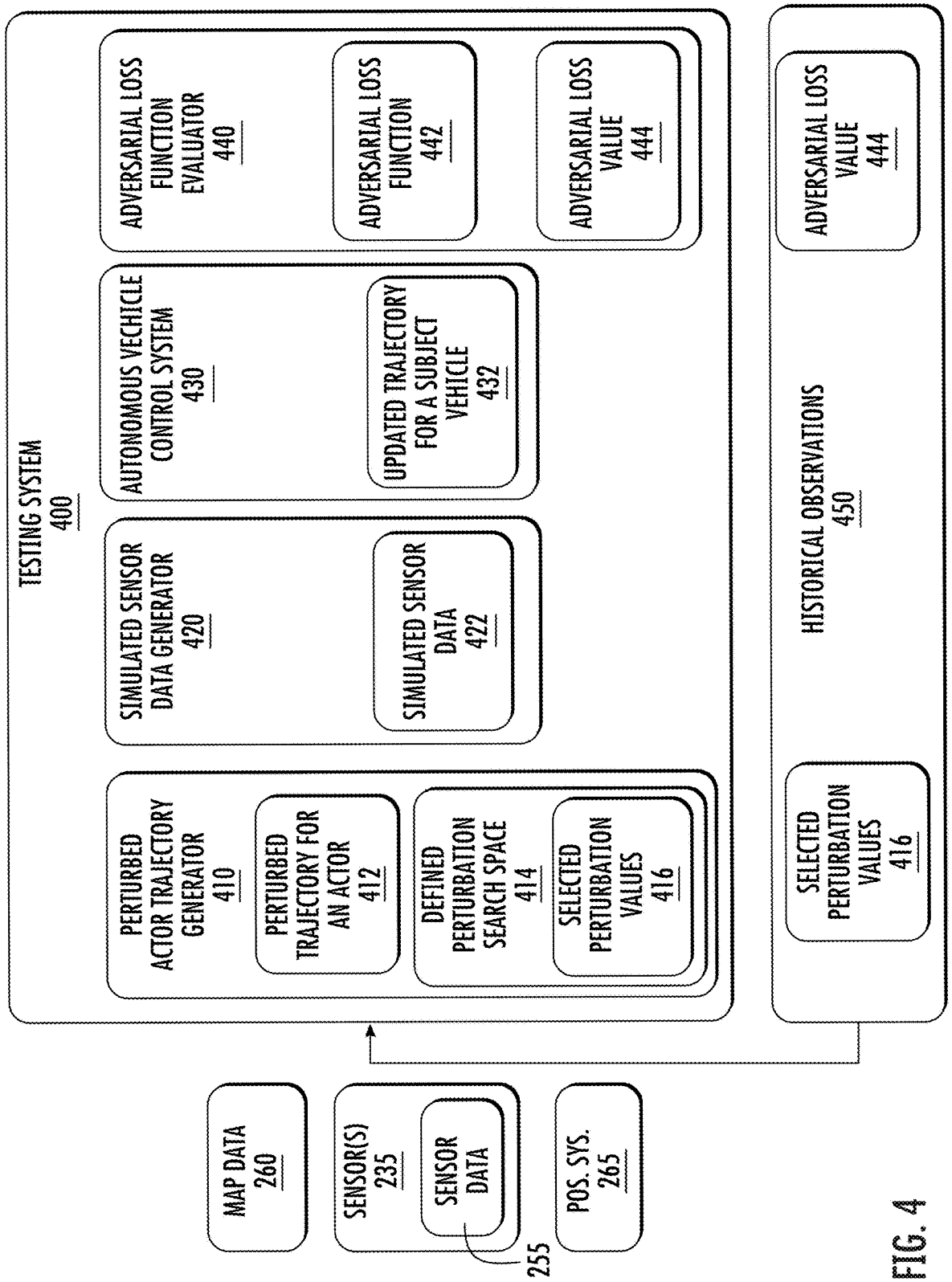
FIG. 4 is a graphical overview of an example testing system of the autonomous system, according to some implementations of the present disclosure.

FIG. 4 depicts an overview of an example testing system 400 of the autonomous system (e.g., robotic platform 102 of FIG. 1, system overview 200 of FIG. 2, vehicle computing system 210 of FIG. 2) according to example implementations of the present disclosure. In some implementations, the testing system 400 can obtain sensor data 255, map data 260, and data from positioning system 265 of FIG. 2 to generate a perturbed trajectory for an actor, generate simulated sensor data, generate an updated trajectory for the subject vehicle and evaluate an adversarial loss function for the autonomous system as described in FIGS. 5-8.

According to some embodiments, the testing system 400 includes a perturbed actor trajectory generator 410, a simulated sensor data generator 420, an autonomous vehicle control system 430, and an adversarial loss function evaluator 440. The testing system 400 generates testing data for an autonomous vehicle. In some instances, the testing system obtains sensor data descriptive of a traffic scenario. The traffic scenario can include a subject vehicle and one or more actors in an environment of the subject vehicle.

In some implementations, the perturbed actor trajectory generator 410 generates a perturbed trajectory 412 for an actor based on selected perturbation values 416. The testing system 400 can define a perturbation search space and select the perturbation values 416 from the defined perturbation search space 414. The perturbed trajectory 412 can be generated based on the selected perturbation values 416. In some implementations, the selected perturbation values 416 can be selected based in part on the historical observations 450. The historical observations 450 can include previously selected perturbation values and previously calculated adversarial loss values. In some instances, the actor that the perturbed trajectory 412 is generated for is a first actor of the one or more actors in the environment.

The testing system 400 can identify one or more actors that are within the surrounding environment of the subject vehicle (e.g., vehicle 205 in FIG. 2) based at least in part on the sensor data 255 that is generated by sensor(s) 235. The perturbed trajectory 412 for an actor can be determined based on the sensor data 255, the map data 260, and data obtained from the positioning system 265. The actors perceived within the surrounding environment can be those within the field of view of the sensor(s) 235 or predicted to be occluded from the sensor(s) 235. This can include actors not in motion or not predicted to move (static actors) or actors in motion or predicted to be in motion (dynamic actors). The testing system 400, using the perturbed actor trajectory generator 410, can process the sensor data 255, the map data 260, and other data to obtain the perturbed trajectory 412 for an actor.

The perturbed actor trajectory generator 410 can generate the perturbed trajectory 412 for an actor that is indicative of one or more states of the actor within a surrounding environment of the subject vehicle. For example, the perturbed trajectory 412 can describe for a given period of time an estimate of the actor's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The perturbed trajectory 412 can be utilized for functions of the simulated sensor data generator 420, the autonomous vehicle control system 430, and the adversarial loss function evaluator 440. For example, the perturbed trajectory 412 can be an input to the simulated sensor data generator 420, the autonomous vehicle control system 430, and the adversarial loss function evaluator 440 in order to determine simulated sensor data 422, an updated trajectory 432 for a subject vehicle, and an adversarial loss value 444.

Additionally, in some implementations, the simulated sensor data generator 420 generates simulated sensor data 422. The simulated sensor data 422 includes data descriptive of the perturbed trajectory 412 for the first actor in the environment.

Moreover, in some implementations, the testing system 400 provides the simulated sensor data 422 as input to the autonomous vehicle control system 430. The autonomous vehicle control system 430 is configured to process the simulated sensor data 422 to generate an updated trajectory 432 for the subject vehicle in the environment.

The updated trajectory 432 for the subject vehicle can be indicative of one or more states (e.g., current, or past state(s)) of the subject vehicle (e.g., vehicle 205 in FIG. 2). For example, the updated trajectory 432 can describe for a given period of time an estimate of the subject vehicle's: current or past location (also referred to as position); current or past speed/velocity; current or past acceleration; current or past heading; current or past orientation; size/footprint (e.g., as represented by a bounding shape, object highlighting, etc.); class (e.g., pedestrian class vs. vehicle class vs. bicycle class, etc.), the uncertainties associated therewith, or other state information. The updated trajectory 432 for a subject vehicle can be utilized for functions of the simulated sensor data generator 420 and the adversarial loss function evaluator 440. For example, the updated trajectory 432 for a subject vehicle can be an input to the simulated sensor data generator 420 and the adversarial loss function evaluator 440 in order to determine simulated sensor data 422 and an adversarial loss value 444.

The autonomous vehicle control system 430 can be configured to generate an updated trajectory 432 of the subject vehicle. The updated trajectory 432 can be indicative of one or more predicted future locations of the subject vehicle. The motion path of the subject vehicle can be based on the updated trajectory 432. For example, the autonomous vehicle control system 430 can determine the updated trajectory 432 along which the subject vehicle is predicted to travel over time. The updated trajectory 432 can be indicative of a path that the subject vehicle is predicted to traverse and an associated timing with which the subject vehicle is predicted to travel along the path. The predicted path can include or be made up of a plurality of way points. In some implementations, the updated trajectory 432 can be indicative of the speed or acceleration at which the subject vehicle is predicted to travel along its associated updated trajectory 432.

Furthermore, in some implementations, the adversarial loss function evaluator 440 evaluates an adversarial loss function 442 based on the updated trajectory 432 for the subject vehicle to generate an adversarial loss value 444. Method 800 of FIG. 8 describes techniques for calculating the adversarial loss value 444.

Subsequently, the selected perturbation values 416 and the adversarial loss value can be added to the set of historical observations. As previously mentioned, the selected perturbation values 416 can be selected based in part on the historical observations 450. In some implementations, the simulated sensor data 422 and the updated trajectory 432 for the subject vehicle can also be added to the set of historical observations.

The testing system 400 can utilize one or more algorithms or machine-learned model(s), such as a trajectory refinement model, sensor data generator model, and an adversarial loss function model, that are configured to determine trajectories of objects (e.g., actors, subject vehicle), evaluate loss functions for an autonomous system, and generate simulated sensor data. This can include, for example, one or more neural networks trained to identify actors within the surrounding environment of the vehicle 205, determine a trajectory for an object, generate simulated sensor data, evaluate (e.g., optimize) an adversarial loss function for an autonomous vehicle, and other data associated therewith.

The machine-learned models (e.g., trajectory refinement model, sensor data generator model, and an adversarial loss function model) can be previously trained by the one or more remote computing system(s) 290B, the operations computing system 290A, or any other device (e.g., remote servers, training computing systems, etc.) remote from or onboard the vehicle 205. For example, the machine-learned models can be learned by a training computing system (e.g., the operations computing system 290A, etc.) over training data stored in a training database. The training data can include sequential multi-modal sensor data indicative of a plurality of environments at different interval of time. In some implementations, the training data can include sensor data 255, perturbed trajectory 412 for an actor, simulated sensor data 422, updated trajectory 432 for a subject vehicle, adversarial loss value 444, perception data 275A, prediction data 275B, and motion plan data 275C.

Figure 5A:
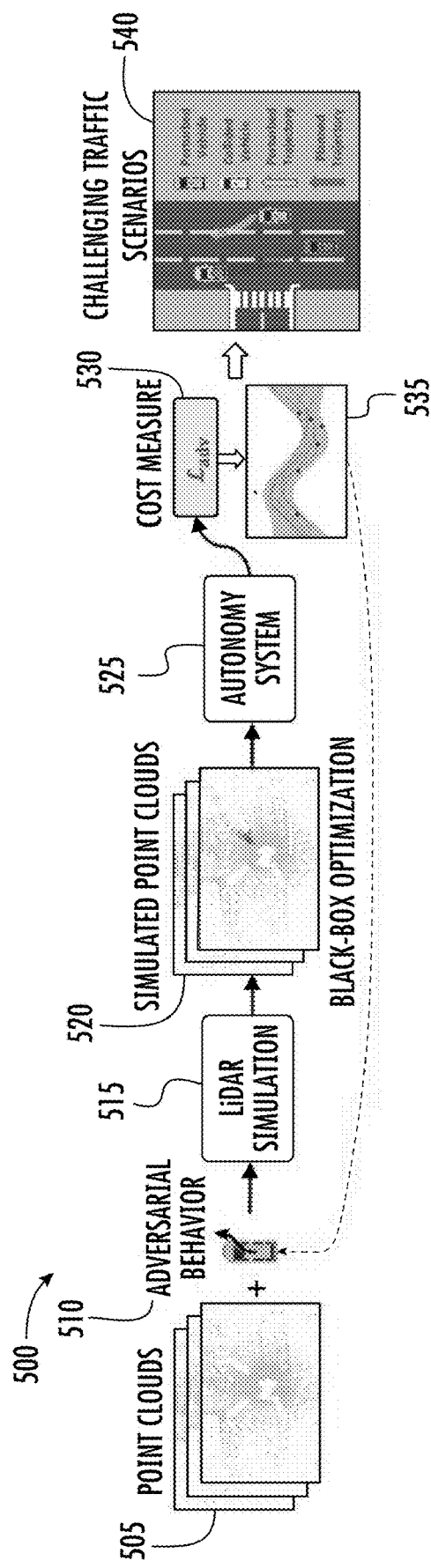
FIG. 5A is a graphical overview of an adversarial scenario generation process implemented by a testing system of the autonomous system, according to some implementations of the present disclosure.

FIG. 5A depicts an adversarial scenario generation process 500 implemented by a testing system (e.g., testing system 400 of FIG. 4) of the autonomous system (e.g., robotic platform 102 of FIG. 1, system overview 200 of FIG. 2, vehicle computing system 210 of FIG. 2) according to example implementations of the present disclosure. FIG. 5A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5A is described with reference to elements/terms described with respect to other systems and figures for exemplary illustrated purposes and is not meant to be limiting. One or more portions of the operations and phases described in FIG. 5A can be performed additionally, or alternatively, by other systems.

According to some embodiments, the adversarial scenario generation process 500 perturbs the maneuvers of interactive actors in an existing scenario with adversarial behaviors that cause realistic autonomy system failures. Given an existing scenario and its original sensor data (e.g., sensor data 255), a computing system (e.g., vehicle computing system 210 of FIG. 2, testing system 400 of FIG. 4) perturbs the scenario by generating a perturbed trajectory for an actor, and determines the interaction of the subject vehicle (e.g., vehicle 205 of FIG. 2) to the simulated sensor data (e.g., simulated sensor data 422 of FIG. 4) based on the new scene configuration. Subsequently, the computing system evaluates the autonomy system (e.g., subject vehicle) on the modified scenario, computes an adversarial objective (e.g., adversarial loss value 444 of FIG. 4), and updates the proposed perturbation using a search algorithm.

In some implementations, an object of the computing system (e.g., vehicle computing system 210 of FIG. 2, testing system 400 in FIG. 4) is to generate realistic, challenging scenarios that can cause autonomy system failure. The objective can be framed as a black box adversarial attack that exercises every component of an autonomy system (e.g., system 200 of FIG. 2), including object detection (e.g., perception 270A of FIG. 2), motion forecasting (e.g., prediction 270B of FIG. 2), and motion planning (e.g., motion planning 270C of FIG. 2). The computing system can examine a defined space of realistic perturbations in actor motions of an existing scenario. Additionally, the computing system can update the sensor data (e.g., sensor data 255, simulated sensor data 422 of FIG. 4) that the subject vehicle (e.g., vehicle 205 of FIG. 2) observes. Moreover, the computing system can evaluate the autonomy system based on the updated sensor data.

As depicted in FIG. 5A, at 505 the computing system obtains point cloud data from sensors (e.g., sensor(s) 235 of FIG. 2). Additionally, at 510, the computing system perturbs the motion trajectories of the actors in an existing scenario to simulate an adversarial behavior. Moreover, at 515, the computing system utilizes a LiDAR simulation to generate simulated point cloud data 520. The simulated point cloud data 520 can include a sequence of LiDAR point clouds that reflect changes in the location of one or more actors. With the simulated point cloud data 520, the computing system uses the autonomy system 525 and generates the planned motion path 535 (e.g., motion plan data 275C of FIG. 2, updated trajectory 432 of FIG. 4) of the subject vehicle. Subsequently, the computing system evaluates the planned motion path 535 with a proposed adversarial objective to generate a cost measure at 530. Furthermore, at 540, the computing system can adjust the scenario perturbation to be more challenging.

As described in the following paragraphs, the example adversarial scenario generation process 500 of FIG. 5A depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5A is described with reference to elements/terms described with respect to other systems and figures for exemplary illustrated purposes and is not meant to be limiting. One or more portions of the operations and phases described in FIG. 5A can be performed additionally, or alternatively, by other systems.

In the problem setup phase, the testing system (e.g., testing system 400 of FIG. 4) defines the autonomy system and an attack formulation. In the modeling adversarial behaviors phase, the testing system parameterizes the adversarial actors' behaviors. In the realistic LiDAR simulation phase, the testing system conducts realistic LiDAR simulation to generate new LiDAR sweeps. In the adversarial scenario search phase, the testing system generates worst-case scenarios by benchmarking the adversarial objective and the black-box optimization algorithms.

Problem Setup Phase

According to some embodiments, the problem setup phase can be initiated by defining $\mathcal{V} = \{v_0, v_1, \ldots, v_M\}$ to be the set of vehicles that compose the scene, where $v_0$ denotes the subject vehicle (e.g., self-driving vehicle (SDV)), M is the number of other vehicles. The objective of a self-driving system can be to find the best planned trajectory $\tau_0^*$ according to a cost function C that maneuvers around the scene, given the available sensor data inputs x, as described in Equation 1.

$$\tau_0^*(x) = \underset{\tau_0}{\operatorname{argmin}}\ C(\tau_0, x) \qquad \text{(Equation 1)}$$

In Equation 1, $\tau_0$ is the subject vehicle's planned trajectory. As x consists of raw sensor data (e.g., LiDAR point clouds, sensor data 255 of FIG. 2), high-definition maps (e.g., map data 260), and other relevant information (e.g., previous states of the subject vehicle, traffic light states), the minimization of Equation 1 represents optimization for the full autonomy system (e.g., system 200), not just a planning module (e.g., motion planning 270C).

In some instances, one of the goals of the testing system is to increase the risk of the subject vehicle by perturbing the behaviors of other actors in a physically plausible manner for an existing traffic scenario. Without loss of generality, the testing system considers perturbing a single actor in the following discussion for brevity, but we apply the testing system for multi-actor perturbations in experiments.

The testing system can characterize the behavior of an adversary by the trajectory $\tau_{adv}$ (e.g., perturbed trajectory 412 for an actor) that an actor will take in the future. As the perturbed actor's trajectory $\tau_{adv}$ differs from its original behavior in the sensor data, the actor's position and the generated occlusions will change, as later described in FIG. 5B. Therefore, the testing system simulates the new LiDAR data given the adversary trajectory $\tau_{adv}$ and subject vehicle trajectory $\tau_{sdv}$ to evaluate the system described in Equation 1. The generation of point clouds in the perturbed traffic scene is described by Equation 2.

$$x_{adv} = f(x, \tau_{adv}, \tau_{sdv}) \qquad \text{(Equation 2)}$$

In Equation 2, $f(\cdot)$ denotes the realistic LiDAR simulation, which is described in the realistic LiDAR simulation phase, for perturbed input $x_{adv}$ given the adversary's trajectory and original sensor data sequence x.

The testing system then defines an adversarial objective $\tau_{adv}$ which is optimized (e.g., maximized) to generate scenarios as described in Equation 3.

$$\tau_{adv}^* = \underset{\tau_{adv}}{\operatorname{argmax}}\ \mathcal{L}_{adv}(\tau_0^*, x_{adv}), \qquad \text{(Equation 3)}$$

In Equation 3, $\tau_0^* = \tau_0^*(x_{adv})$ is the optimal planned trajectory of the subject vehicle under simulated scene $x_{adv}$. Additional discussion of the design of the adversarial loss $\mathcal{L}_{adv}$ is deferred to the adversarial scenario search phase.

Modeling Adversarial Behaviors Phase

To produce physically feasible actor behaviors, the testing system parameterizes the trajectory $\tau_{adv} = \{s_t\}_{t=0}^T$ as a sequence of kinematic bicycle model states $s_t = \{x_t, y_t, \theta_t, v_t, \kappa_t, a_t\}$ in the next T timesteps. Here (x, y) is the center position of the perturbed actor, θ is the heading, v and a are the forward velocity and acceleration, and κ is the vehicle path's curvature. Candidate adversary trajectories can be generated by perturbing the change of curvature $\dot{\kappa}_t$ and acceleration values $a_t$ within set bounds at different timesteps and using the kinematic bicycle model to compute the other states.

Moreover, to enlarge the space of sampled adversarial behaviors, the testing system also allows the perturbation of initial states ($x_0$, $y_0$, $\theta_0$, $v_0$) within set bounds. In summary, the perturbation space can be depicted as $\delta = \{\Delta s_0, (a_0, \dot{\kappa}_t|_{t=0}), \ldots, (a_{T-1}, \dot{\kappa}_t|_{t=T-1})\}$.

To increase the perturbed trajectory's plausibility, the testing system ensures the subject vehicle does not collide with other actors or the original expert trajectory of the subject vehicle. In practice, the testing system accomplishes this by first performing rejection sampling to create a set of physically feasible trajectories $\mathcal{T}_{a\ adv}$ and then projecting the trajectory generated by δ on to the physically feasible set, measured by $L_2$ distance. The search space can be low-dimensional and conducive to query-based black box optimization, while still allowing for fine-grained actor motion control.

Realistic LiDAR Simulation Phase

Figure 5B:
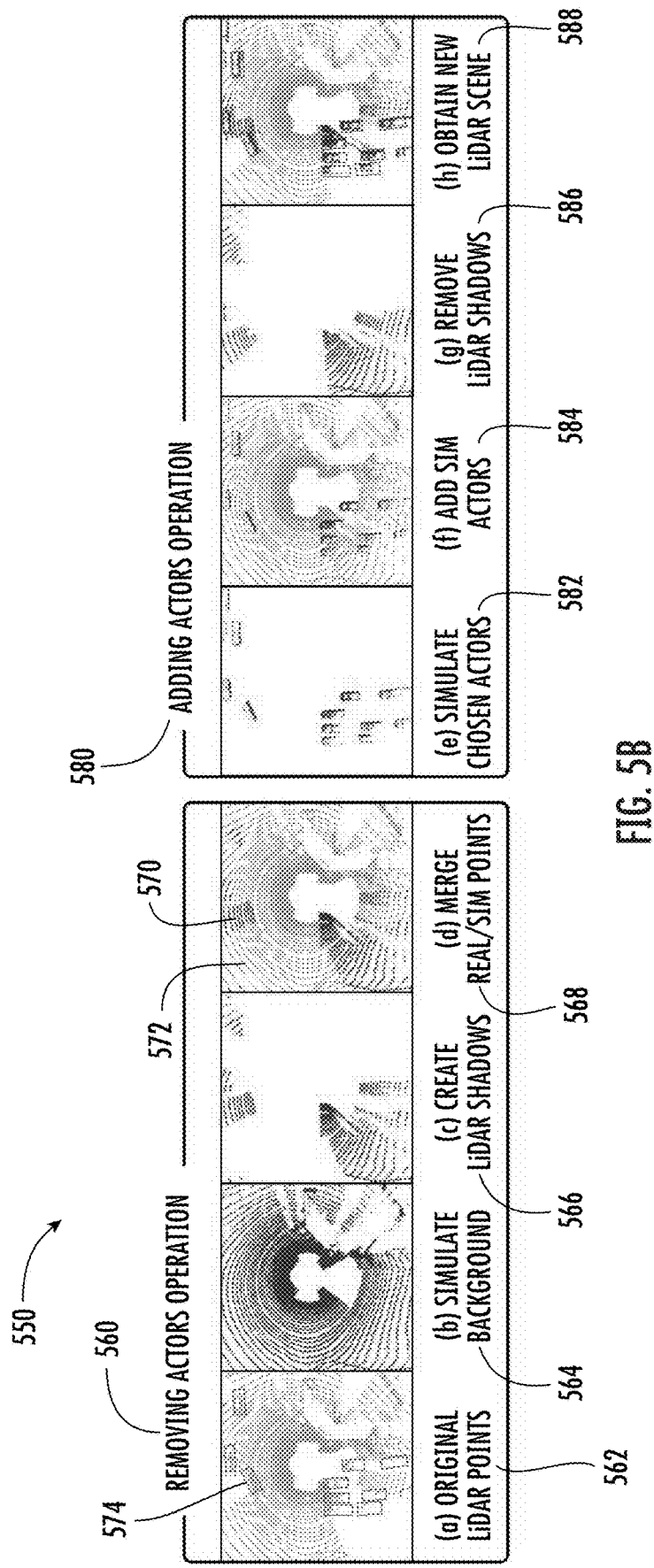
FIG. 5B is a graphical depiction of an exemplary LiDAR simulation for scenario perturbations, according to some implementations of the present disclosure.

FIG. 5B depicts an exemplary LiDAR simulation 550 for scenario perturbations according to example implementations of the present disclosure. Given a scenario perturbation on the motions of actors, the previously recorded LiDAR data can be modified, by the testing system, to accurately reflect the updated scene configuration. In the removing actors operation 560, the testing system can remove one or more original actor LiDAR observations. In the adding actors operation 580, the testing system can replace one or more original actor LiDAR observations with simulated actor LiDAR observations at the perturbed locations, while ensuring sensor realism. The example depicted in FIG. 5B perturbs all actors left by a predetermined distance (e.g., five meters). FIG. 5B depicts operations performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 5B is described with reference to elements/terms described with respect to other systems and figures for exemplary illustrated purposes and is not meant to be limiting. One or more portions of the operations and phases described in FIG. 5B can be performed additionally, or alternatively, by other systems.

Given an initial traffic scenario and the corresponding adversarial perturbation to the behaviors of the actors, the testing system modifies the existing real LiDAR sweeps to reflect the perturbation. The testing system can adopt a high-fidelity LiDAR simulator, which leverages real world data to generate realistic background meshes and dynamic object assets, and then applies physics-based raycasting and machine learning to generate realistic LiDAR point clouds (e.g., simulated sensor data 422). Given a modified scene configuration, the testing system can use the LiDAR simulator to render a simulated point cloud (e.g., simulated sensor data 422), and then update the real LiDAR sweep with the modified regions. The testing system can choose to update the sensor data for modified regions only, instead of generating the full sweep to speed up the query function $f$ in Equation 2. Specifically, the testing system can cache the simulated background LiDAR, as the subject vehicle trajectory is fixed during the actor perturbation. The sensor perturbation is illustrated in FIG. 5B.

The testing system can modify the LiDAR sensor data to reflect that the scenario perturbation is non-trivial, as the LiDAR's sensing characteristics cause specific visibility artifacts that can exist in the generated scene to be realistic and physically accurate. The testing system can perform two operations for sensor simulation for modified scenarios. The removing actors operation 560 removes the existing benign actors' LiDAR point cloud and fills the LiDAR shadow that has been created. The adding actors operation 580 inserts the adversarial actors' LiDAR point cloud, while accounting for occlusion.

Removing Actors Operation

Given an original LiDAR point cloud 562, the testing system first removes the points within the bounding boxes 574 of perturbed actors and simulates background points 564 using a background mesh of a LiDAR simulator. The testing system then converts the simulated and real LiDAR sweeps into a range image, in order to identify the specific rays missing in the real LiDAR sweep 566 that exist in the simulated LiDAR. By taking the element-wise minimum ray distance between the range images, the testing system can merge the LiDAR point clouds. The testing system generates the merged point cloud 568 after one or more actors is removed, where the first pattern 570 corresponds to the simulated points and the second pattern 572 corresponds to the original real points.

Adding Actors Operation

Once the testing system has removed the selected actors (e.g., bounding boxes 574) from the LiDAR sweep, the testing system can update the LiDAR with the actors at their new locations. The testing system can first render the simulated LiDAR for the actors at their new locations 582 using a vehicle asset bank of the LiDAR simulator. The testing system can then generate a real LiDAR point cloud with the added actors 584. However, when a LiDAR ray hits an object, the remaining path of the ray becomes occluded, creating a LiDAR shadow. Similar to the actor removal process, the testing system can create range images of the simulated and real LiDAR, and merge the LiDAR point clouds, thereby removing the LiDAR points of the now-occluded regions 586 and obtaining the final modified LiDAR sweep 588. The generated scenes can be realistic and match the desired perturbation in the motions of the actors, as described in FIG. 5B.

Adversarial Scenario Search Phase

Given that the aim is to create a general adversarial scenario generation framework, the testing system considers the autonomy system as a black box, where the testing system accesses the evaluation scores (e.g., adversarial loss value 444) through limited queries. The testing system can find the perturbation that optimizes the subject vehicle's planned trajectory cost. In this phase, the testing system utilizes an adversarial objective to optimize in order to produce worst-case scenarios.

Figure 7:
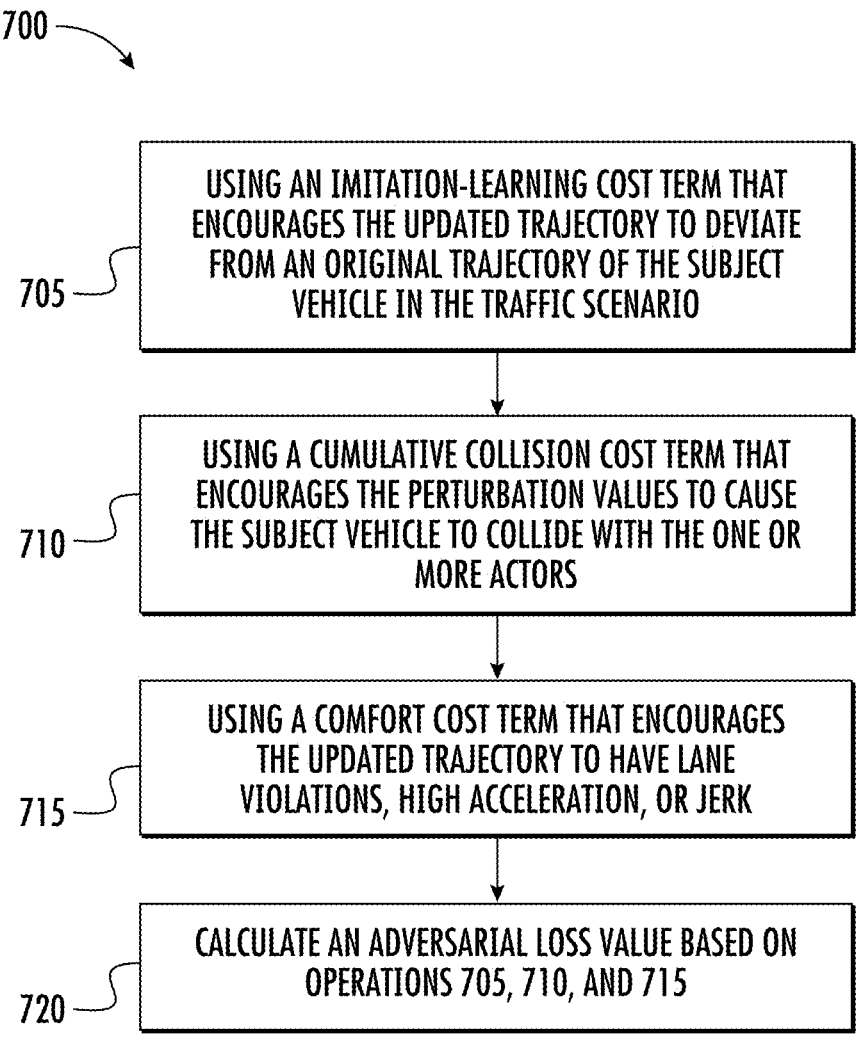
FIG. 7 is a flowchart of a method for determining an adversarial loss value using an adversarial loss function, according to some implementations of the present disclosure.

Adversarial Objective:

To induce autonomy system failures, the testing system can use a combination of costs as an adversarial loss function. FIG. 7 further describes how the adversarial loss function can utilize these costs to calculate the adversarial loss value. These costs can be similar to costs in Equation 1 that the testing system tries to optimize (e.g., minimize). The testing system can first include $l_{IL}$, an imitation-learning based cost that encourages the subject vehicle's output plan to deviate from the recorded human trajectory in the original scenario. The testing system can compute the imitation-learning based cost as a smooth $l_1$ distance between output trajectory $\tau_0^*$ and the ground-truth for the entire scenario horizon. The testing system can also compute a cumulative collision cost $l_{col}^t$ that encourages the perturbation to cause the subject vehicle to collide with other actors in the scene. Finally, the testing system can add a comfort cost $c_s^t(x_{adv}, \tau_0^*)$ that encourages the output plan $\tau_0^*$ to have lane violations and be dangerous (e.g., high accelerations and jerk) at each timestep t. The full adversarial loss is defined as:

$$\mathcal{L}_{adv} = \min_{\tau_0} \left[ l_{IL} + \sum_t l_{col}^t + \sum_t c_s^t(x_{adv}, \tau_0^*) \right]$$

By using multiple different costs, it allows the testing system to identify different types of autonomy system failures, such as unnatural trajectories, collisions, and hard braking.

Search Algorithms

The testing system is a framework that can use any black-box search algorithm to identify autonomy system failures. The search algorithm attempts to find desirable scenarios by optimizing (e.g., maximizing) the adversarial objective $\mathcal{L}_{adv}$ in Equation 2. The search algorithm queries the autonomy system with a candidate perturbation $\tau_{adv}$ to obtain a query pair ($\tau_{adv}$, $\mathcal{L}_{adv}$) and maintains a history $\mathcal{H}$ of past query pairs to generate the next candidate perturbation. The testing system can use a wide variety of black-box search algorithms including: (1) Bayesian optimization; (2) genetic algorithms; (3) random search; and (4) gradient estimation methods. Specifically, the Bayesian optimization algorithm maintains a surrogate model and selects the next candidate based on the acquisition function and current model states. For the genetic algorithms, a group of candidate trajectories are evolved to optimize the objective and the best candidate is preserved at each iteration. For the random search algorithm, the perturbations sampled from a pre-defined orthonormal basis are added or subtracted to original input iteratively. Another branch of query-based black-box search algorithms estimate the gradient through the target model. Furthermore, the gradient estimation methods optimize the expectation of the objective under one search distribution and further leverage temporal information to improve the query efficiency.

Overall Adversarial Scenario Generation Algorithm

According to some embodiments, the framework of testing system can be described using Algorithm 1. Given an initial traffic scene, the testing system can pick the actors to be perturbed using heuristics, such as the closest reachable actors, and then sample physically plausible trajectories $\mathcal{T}_{a\ adv}$ to ensure that the perturbations remain in this set. The testing system then obtains the perturbation $\delta^{(k)}$ at iteration k based on historical observations $\mathcal{H}$ using a selected black-box search algorithm (Line 5 of Algorithm 1). The testing system can roll out the kinematics bicycle model states with initial state $s_0$ and the perturbation $\delta^{(k)}$, and project onto the feasible set $\mathcal{T}_{a\ adv}$ to obtain the adversarial trajectories for the perturbed actors (Line 6 of Algorithm 1). After that, the testing system can update the sensor data accordingly (Line 7 of Algorithm 1) and evaluate the full autonomy system on generated scenarios to compute $\mathcal{L}_{adv}$ (Lines 8 and 9 of Algorithm 1). Finally, after running the procedure for N iterations, the testing system can obtain the adversarial behaviors of perturbed actors as well as corresponding simulated LiDAR data.

---
Algorithm 1 Generating Adversarial Scenarios
---
Require: Sensory input x, initial state $s_0$ of the perturbed
actor, adversarial objective $\mathcal{L}_{adv}$, number of queries N.
1: Pick the perturbed actor $v_{adv}$ heuristically
2: Generate physically plausible trajectories set $\mathcal{T}_{adv}$
3: Initialize observation set $\mathcal{H} = \varnothing$
4: for k = 1, . . . , N do
5:   Select $\delta^{(k)}$ based on black-box algorithms and historical observations $\mathcal{H}$.
6:   $\tau_{adv}^{(k)} = \Pi_{\tau \in \mathcal{T}_{adv}}$ [BICYCLE ($S_0, \delta^{(k)}$)]
7:   $x_{adv}^{(k)} = f(x, \tau_{adv}^{(k)}, \tau_{sdv})$
8:   Run the autonomy system and obtain the optimal SDV plan $\tau_0^{(k)} = \tau_0^*(x_{adv}^{(k)})$
9:   Calculate the adversarial loss of the optimal plan:
   $\mathcal{L}_{adv}^{(k)} = \mathcal{L}_{adv}(\tau_0^{(k)}, x_{adv}^{(k)})$
10:   Update observation set $\mathcal{H} = \mathcal{H} \cup \{(\tau_{adv}^{(k)}, \mathcal{L}_{adv}^{(k)})\}$
11: end for
12:   $\tau_{adv}^* = \arg\max_{\tau_{adv}^{(k)}, k \in [N]} \mathcal{L}_{adv}^{(k)}$
---

According to some embodiments, the testing system can use an adversarial framework to generate worst-case scenarios for modern autonomy systems. The testing system can identify physically plausible failure cases that impose risks to the full autonomy stack by simulating the sensor data based on the perturbed behaviors. Furthermore, the testing system can leverage these scenarios in training to further improve the robustness and performance of the autonomy system.

Figure 6:
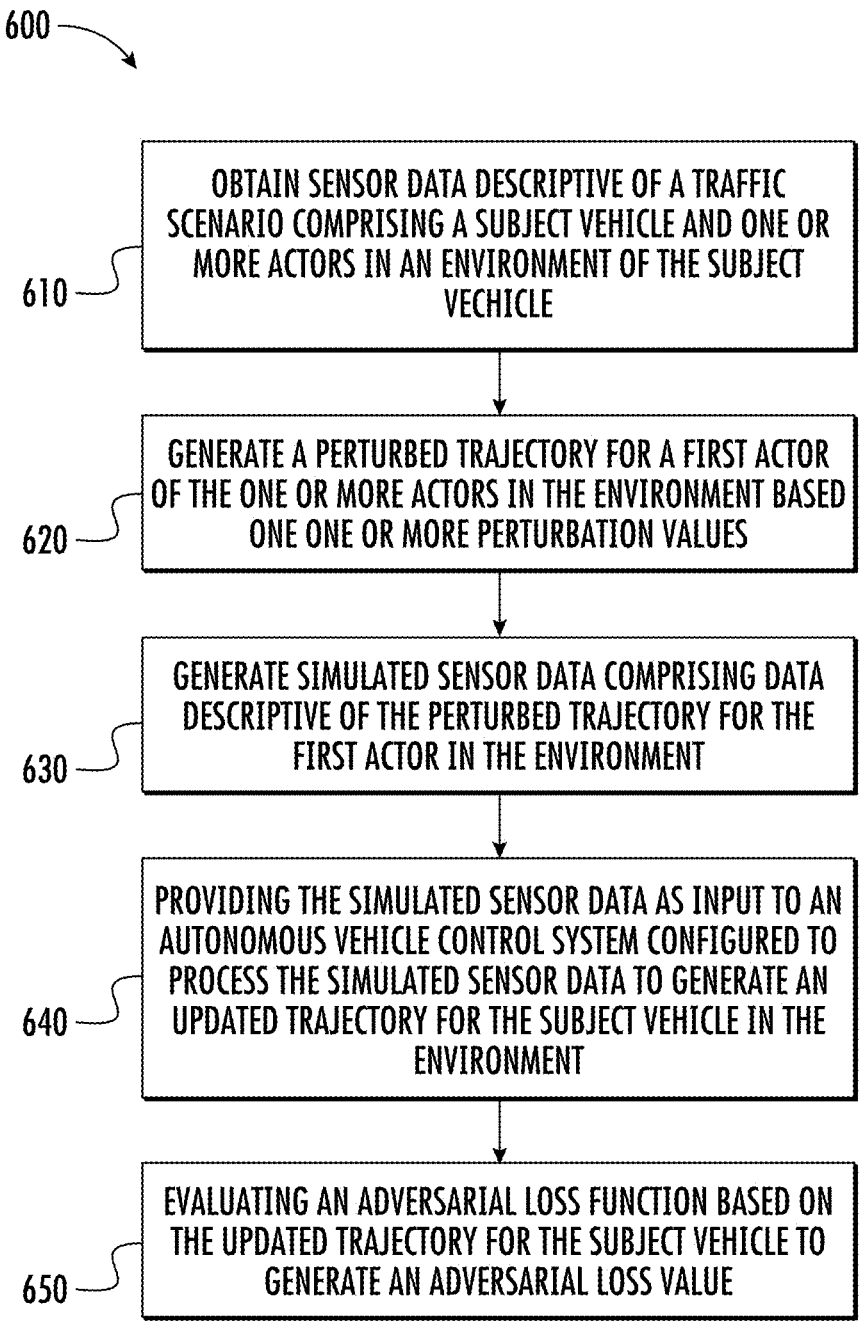
FIG. 6 is a flowchart of a method for generating testing data for an autonomous vehicle, according to some implementations of the present disclosure.

FIG. 6 depicts a flowchart of a method 600 for generating testing data for an autonomous vehicle, according to aspects of the present disclosure. One or more portion(s) of the method 600 can be implemented by a computing system that includes one or more computing devices such as, for example, the computing systems described with reference to the other figures (e.g., autonomous platform 105, vehicle computing system 210, operations computing system(s) 290A, remote computing system(s) 290B, testing system 400). Each respective portion of the method 600 can be performed by any (or any combination) of one or more computing devices. Moreover, one or more portion(s) of the method 600 can be implemented as an algorithm on the hardware components of the device(s) described herein (e.g., FIGS. 1-2, 4, 9), for example, to train a machine learning model to select a perturbation value, generate a perturbed trajectory 412 for an actor, generate simulated sensor data 422, generate an updated trajectory 432 for a subject vehicle, and calculate an adversarial loss value 444 as described in FIGS. 4, 7, and 8.

FIG. 6 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 6 is described with reference to elements/terms described with respect to other systems and figures for exemplary illustrated purposes and is not meant to be limiting. One or more portions of method 600 can be performed additionally, or alternatively, by other systems.

At 610, a computing system obtains sensor data descriptive of a traffic scenario including a subject vehicle and one or more actors in an environment of the subject vehicle. In some instances, the computing system can be the autonomous platform 105, vehicle computing system 210, operations computing system(s) 290A, remote computing system(s) 290B, or testing system 400. Additionally, the subject vehicle can be the autonomous platform 105 or vehicle 205. Moreover, the one or more actors can be the one or more dynamic object(s) 130 (e.g., actors, simulated objects, real-world objects, etc.). Furthermore, the sensor data obtained at 610 can be sensor data 255 that is obtained from sensor(s) 235.

In some instances, the sensor data includes real-world sensor data previously collected by one or more physical sensors in the environment.

In some instances, the computing system can select one or more perturbation values from a defined perturbation search space. The defined perturbation search space can be determined or generated by the computing system. In some instances, the perturbation search space can include initial state values and a set of change in curvatures and acceleration values over a number of timesteps.

At 620, the computing system generates a perturbed trajectory for a first actor of the one or more actors in the environment based on one or more perturbation values. The one or more perturbation values can be selected from a defined perturbation search space. Method 800 of FIG. 8 describes an exemplary method for selecting the one or more perturbation values from a defined perturbation search space. In some instances, the perturbed trajectory generated at 620 can be the perturbed trajectory 412 for an actor that is generated by the perturbed actor trajectory generator 410 as described in FIG. 4.

In some instances, the perturbed trajectory for the first actor is generated at 620 by the computing system first generating a defined perturbation search space. The perturbation search space can include initial state values and a set of change in curvatures and acceleration values over a number of timesteps. Additionally, the computing system can select one or more perturbation values from the defined perturbation search space. Moreover, the computing system can perform a black-box optimization technique to select the one or more perturbation values from the defined perturbation search space. For example, the black-box optimization technique can include one of the following: Bayesian optimization; a genetic algorithm; random search; or a gradient estimation method. Moreover, the perturbed trajectory for the first actor that is generated at 620 can be based on the selection of the one or more perturbation values. In other example implementations, the computing system can employ a reinforcement learning agent to select the perturbation values from the perturbation search space. The reinforcement learning agent can be trained (e.g., updated) based on the adversarial loss function. Some example reinforcement learning agents can be or include a neural network such as a recurrent neural network (e.g., long short-term memory neural network).

In some instances, the perturbed trajectory for the first actor is generated at 620 by first creating a set of physically feasible trajectories for the first actor. Additionally, the computing system can generate an initial perturbed trajectory for the first actor based on the one or more perturbation values. Moreover, the computing system can project the initial perturbed trajectory onto the set of physically feasible trajectories to generate the perturbed trajectory.

In some instances, the perturbed trajectory for the first actor is generated at 620 by ensuring that the perturbed trajectory avoids collision with: (i) one or more existing trajectories of one or more other actors in the environment; or (ii) an initial trajectory for the subject vehicle in the environment.

In some instances, the perturbed trajectory generated at 620 can be parameterized as a series of kinematic bicycle model states. In some instances, the computing system can select a closest reachable actor as the first actor.

At 630, the computing system generates simulated sensor data including data descriptive of the perturbed trajectory for the first actor in the environment. In some instances, the simulated sensor data generated at 630 can be the simulated sensor data 422 that is generated by the simulated sensor data generator 420 as described in FIG. 4.

At 640, the computing system provides the simulated sensor data as input to an autonomous vehicle control system configured to process the simulated sensor data to generate an updated trajectory for the subject vehicle in the environment. In some instances, the updated trajectory for the subject vehicle generated at 640 can be the updated trajectory 432 for a subject vehicle that is generated by the autonomous vehicle control system 430 as described in FIG. 4.

In some instances, the autonomous vehicle control system can include one of the following: an end-to-end imitation learning system; a neural motion planner; a jointly learnable behavior and trajectory planning system; or a perceive, predict, and plan system.

In some instances, the autonomous vehicle control system is a simulated AV control system. The simulated AV control can control an AV in a simulated environment and not a physical real-life environment.

At 650, the computing system evaluates an adversarial loss function based on the updated trajectory for the subject vehicle to generate an adversarial loss value. In some instances, the adversarial loss value generated at 650 can be the adversarial loss value 444 that is generated by the adversarial loss function evaluator 440 using the adversarial loss function 442 as described in FIG. 4.

In some instances, the autonomous vehicle control system (e.g., autonomous vehicle control system 430) described at 640 can include one or more machine-learned models. Additionally, method 600 can further include updating one or more values of one or more parameters of the one or more machine-learned models based on the adversarial loss function generated at 650.

In some instances, the adversarial loss function includes one or more of the following: (1) an imitation-learning cost term that encourages the updated trajectory to deviate from an original trajectory of the subject vehicle in the traffic scenario; (2) a cumulative collision cost term that encourages the perturbation values to cause the subject vehicle to collide with the one or more actors; and (3) a comfort cost term that encourages the updated trajectory to have lane violations, high acceleration, or jerk.

In some instances, the perturbed trajectory for the first actor is generated at 620 by the computing system selecting the one or more perturbation values from a defined perturbation search space based at least in part on a set of historical observations associated with previously selected perturbation values. Additionally, the method further includes adding the one or more perturbation values that can be selected at 620 and the adversarial loss value that is evaluated at 650 to the set of historical observations, and then repeating operations 610-640.

In some instances, the perturbed trajectory for the first actor is generated at 620 by the computing system selecting the one or more perturbation values with an objective of optimizing an adversarial loss value provided by the adversarial loss function that is evaluated at 650.

In some instances, the sensor data obtained at 610 includes light detection and ranging (LiDAR) data, and the simulated sensor data generated at 630 includes simulated LiDAR data. The computing system can remove LiDAR points within a bounding box associated with the first actor. Additionally, the computing system can simulate new background LiDAR points after removing the LiDAR points within the bounding box. Moreover, the computing system can insert simulated LiDAR points based on the perturbed trajectory for the first actor. Furthermore, the computing system can remove LiDAR points included within a synthesized LiDAR shadow for one or more occluded regions based on the perturbed trajectory for the first actor.

The method 600 can be further modified by one or more portion(s) of method 700 in FIG. 7. For example, one or more portions of method 700 can be performed in addition to the method 600. FIG. 7 depicts a flowchart of a method 700 for determining an adversarial loss value using an adversarial loss function, according to aspects of the present disclosure. One or more portion(s) of the method 700 can be implemented by a computing system that includes one or more computing devices such as, for example, the computing systems described with reference to the other figures (e.g., autonomous platform 105, vehicle computing system 210, operations computing system(s) 290A, remote computing system(s) 290B, testing system 400). Each respective portion of the method 700 can be performed by any (or any combination) of one or more computing devices. Moreover, one or more portion(s) of the method 700 can be implemented as an algorithm on the hardware components of the device(s) described herein (e.g., FIGS. 1-2, 4, 9), for example, using the adversarial loss value or the adversarial loss function to train a machine learning model to generate a perturbed trajectory 412 for an actor, simulated sensor data 422, and an updated trajectory 432 for a subject vehicle as described in FIGS. 4, 6, and 8.

Those of ordinary skill in the art, using the disclosures provided herein, will understand that the elements of any of the methods discussed herein can be adapted, rearranged, expanded, omitted, combined, or modified in various ways without deviating from the scope of the present disclosure. FIG. 7 is described with reference to elements/terms described with respect to other systems and figures for exemplary illustrated purposes and is not meant to be limiting. One or more portions of method 700 can be performed additionally, or alternatively, by other systems.

At 705, a computing system evaluates the adversarial loss function used in operation 650 of method 600 by using an imitation-learning cost term that encourages the updated trajectory to deviate from an original trajectory of the subject vehicle in the traffic scenario. In some instances, the adversarial loss function evaluator 440 uses the imitation learning cost term at 705 as part of the adversarial loss function 442 in order to determine the adversarial loss value 444 as described in FIG. 4.

At 710, the computing system evaluates the adversarial loss function used in operation 650 of method 600 by using a cumulative collision cost term that encourages the perturbation values to cause the subject vehicle to collide with the one or more actors. In some instances, the adversarial loss function evaluator 440 uses the cumulative collision cost term at 710 as part of the adversarial loss function 442 in order to determine the adversarial loss value 444 as described in FIG. 4.

At 715, the computing system evaluates the adversarial loss function used in operation 650 of method 600 by using a comfort cost term that encourages the updated trajectory to have lane violations, high acceleration, and/or jerk. In some instances, the adversarial loss function evaluator 440 uses the comfort cost term at 715 as part of the adversarial loss function 442 in order to determine the adversarial loss value 444 as described in FIG. 4.

At 715, the computing system calculates the adversarial loss value based on the evaluation at 705, 710, and/or 715. In some instances, the adversarial loss function evaluator 440 uses the imitation learning cost term at 705, the cumulative collision cost term at 710, and the comfort cost term at 715 as part of the adversarial loss function 442 in order to calculate the adversarial loss value 444 as described in FIG. 4.

In some implementations, the adversarial loss value 444 calculated at 715 can be added to the historical observations 450 of FIG. 4. Additionally, the one or more perturbation values selected at 620 of method 600 can be selected based on the historical observations 450, which includes previously calculated adversarial loss values. Moreover, the one or more perturbation values are selected at 620 of method 600 with an objective of optimizing an adversarial loss value provided by the adversarial loss function.

Figure 8:
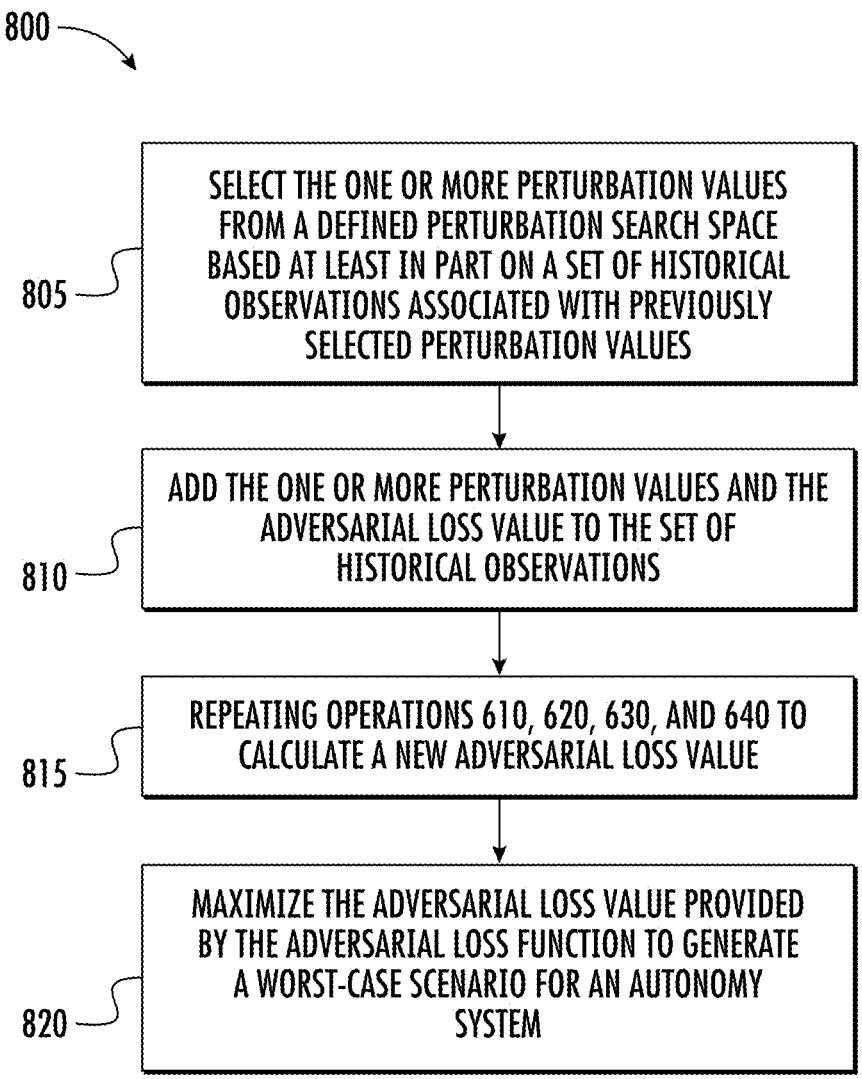
FIG. 8 is a flowchart of a method for selecting perturbation values bases on a set of historical observations, according to some implementations of the present disclosure.

The method 600 can be further modified by one or more portion(s) of method 800 in FIG. 8. For example, one or more portions of method 800 can be performed in addition to the method 600 and method 700. FIG. 8 depicts a flowchart of a method 800 for selecting perturbation values bases on a set of historical observations, according to aspects of the present disclosure. One or more portion(s) of the method 800 can be implemented by a computing system that includes one or more computing devices such as, for example, the computing systems described with reference to the other figures (e.g., autonomous platform 105, vehicle computing system 210, operations computing system(s) 290A, remote computing system(s) 290B, testing system 400). Each respective portion of the method 800 can be performed by any (or any combination) of one or more computing devices. Moreover, one or more portion(s) of the method 800 can be implemented as an algorithm on the hardware components of the device(s) described herein (e.g., FIGS. 1-2, 4, 9), for example, using historical observations associated with previously selected perturbation values to train a machine learning model to select perturbation values associated with a perturbed trajectory 412 for an actor, generate simulated sensor data 422, an generate an updated trajectory 432 for a subject vehicle, calculate an adversarial loss value as described in FIGS. 4, 6, and 7.

At 805, the computing system selects the one or more perturbation values from a defined perturbation search space based at least in part on a set of historical observations associated with previously selected perturbation values. In some instances, the one or more perturbation values selected at 805 can be the one or more perturbation values that are used in operation 620 to generate the perturbed trajectory for the first actor as described in FIG. 6. In some instances, the historical observations described at 805 can be the historical observations 450 as described in FIG. 4.

At 810, the computing system adds the one or more perturbation values and the adversarial loss value to the set of historical observations. Operations 650 of FIG. 6 and method 700 of FIG. 7 describe techniques for calculating the adversarial loss value. In some instances, the one or more perturbation values and the adversarial loss value added at 810 can be the selected perturbation values 416 and the adversarial loss value 444 described in FIG. 4. Additionally, the set of historical observations described at 810 can be the historical observations 450 as described in FIG. 4.

At 815, the computing system can repeat operations 610, 620, 630, and 640 of method 600 as described in FIG. 6. For example, once the selected perturbation values and the calculated adversarial loss value is added to the historical observations, then the computing system can repeat method 600 to generate another updated trajectory for the subject vehicle. Additionally, a new adversarial loss value can be calculated with an objective of optimizing (e.g., maximizing) the adversarial loss value provided by the adversarial loss function.

In some implementations, method 800 can further include operation 820, where the computing system optimizes (e.g., maximizes) the adversarial value provided by the adversarial loss function by repeating operations 805, 810, and 815 to generate a worst-case scenario for an autonomy system.

Techniques described in FIG. 8 identify physically plausible failure cases that impose risks to a full autonomy stack by simulating the sensor data based on the perturbed behaviors. The computing system can generate failure cases at scale for a wide range of systems. Additionally, the computing system can leverage these scenarios in training to further improve the robustness and performance of the autonomy system.

Figure 9:
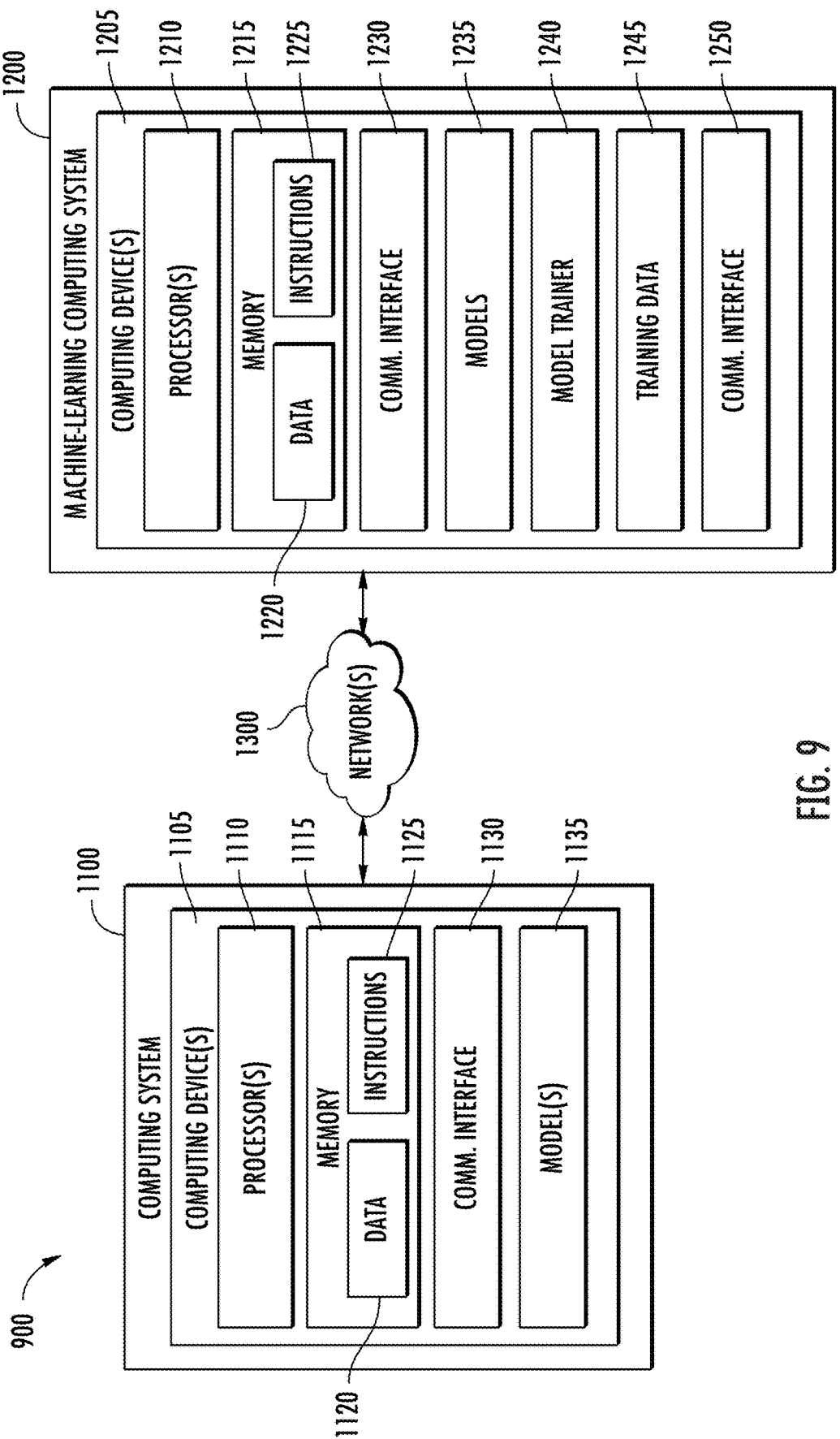
FIG. 9 is a block diagram of a computing system, according to some implementations of the present disclosure.

FIG. 9 depicts a block diagram of an example computing system 900 according to example embodiments of the present disclosure. The example computing system 900 includes a computing system 1100 and a machine learning computing system 1200 that are communicatively coupled over one or more networks 1300.

In some implementations, the computing system 1100 can perform one or more observation tasks such as, for example, by obtaining sensor data (e.g., object data, traffic data, multi-modal sensor data) associated with an environment. In some implementations, the computing system 1100 can be included in a robotic platform. For example, the computing system 1100 can be on-board an autonomous vehicle. In other implementations, the computing system 1100 is not located on-board a robotic platform. The computing system 1100 can include one or more distinct physical computing devices 1105.

The computing system 1100 (or one or more computing device(s) 1105 thereof) can include one or more processors 1110 and a memory 1115. The one or more processors 1110 can be any suitable processing device (e.g., a processor core, a microprocessor, an ASIC, a FPGA, a controller, a microcontroller, etc.) and can be one processor or a plurality of processors that are operatively connected. The memory 1115 can include one or more non-transitory computer-readable storage media, such as RAM, ROM, EEPROM, EPROM, one or more memory devices, flash memory devices, etc., and combinations thereof.

The memory 1115 can store information that can be accessed by the one or more processors 1110. For instance, the memory 1115 (e.g., one or more non-transitory computer-readable storage mediums, memory devices) can store data 1120 that can be obtained, received, accessed, written, manipulated, created, or stored. The data 1120 can include, for instance, object data, traffic element data, hybrid graph data, image data, LiDAR data, multi-modal sensor data, models, intermediate and other scene representations, or any other data or information described herein. In some implementations, the computing system 1100 can obtain data from one or more memory device(s) that are remote from the computing system 1100.

The memory 1115 can also store computer-readable instructions 1125 that can be executed by the one or more processors 1110. The instructions 1125 can be software written in any suitable programming language or can be implemented in hardware. Additionally, or alternatively, the instructions 1125 can be executed in logically or virtually separate threads on processor(s) 1110.

For example, the memory 1115 can store instructions 1125 that when executed by the one or more processors 1110 cause the one or more processors 1110 (the computing system 1100) to perform any of the operations, functions, or methods/processes described herein, including, for example, obtain sensor data, generate an object observation, generate a path observation, determine an object size, generate an initial object trajectory, generate a refined object trajectory, determine a motion plan, implement a motion plan, update a machine-learned model, and so on.

According to an aspect of the present disclosure, the computing system 1100 can store or include one or more machine-learned models 1135. As examples, the machine-learned models 1135 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the computing system 1100 can receive the one or more machine-learned models 1135 from the machine learning computing system 1200 over network(s) 1300 and can store the one or more machine-learned models 1135 in the memory 1115. The computing system 1100 can then use or otherwise implement the one or more machine-learned models 1135 (e.g., by processor(s) 1110). In particular, the computing system 1100 can implement the machine-learned model(s) 1135 to obtain sensor data, generate an object observation, generate a path observation, determine an object size, generate an initial object trajectory, generate a refined object trajectory, determine a motion plan, implement a motion plan, update a machine-learned model, and so on.

The machine learning computing system 1200 can include one or more computing devices 1205. The machine learning computing system 1200 can include one or more processors 1210 and a memory 1215. The one or more processors 1210 can be any suitable processing device (e.g., a processor core, a microprocessor, an ASIC, a FPGA, a controller, a microcontroller, etc.) and can be one processor or a plurality of processors that are operatively connected. The memory 1215 can include one or more non-transitory computer-readable storage media, such as RAM, ROM, EEPROM, EPROM, one or more memory devices, flash memory devices, etc., and combinations thereof.

The memory 1215 can store information that can be accessed by the one or more processors 1210. For instance, the memory 1215 (e.g., one or more non-transitory computer-readable storage mediums, memory devices) can store data 1220 that can be obtained, received, accessed, written, manipulated, created, or stored. The data 1220 can include, for instance, object data, traffic element data, hybrid graph data, multi-modal sensor data, intermediate representations, scene representations, simulation data, data associated with models, or any other data or information described herein. In some implementations, the machine learning computing system 1200 can obtain data from one or more memory device(s) that are remote from the machine learning computing system 1200.

The memory 1215 can also store computer-readable instructions 1225 that can be executed by the one or more processors 1210. The instructions 1225 can be software written in any suitable programming language or can be implemented in hardware. Additionally, or alternatively, the instructions 1225 can be executed in logically or virtually separate threads on processor(s) 1210.

For example, the memory 1215 can store instructions 1225 that when executed by the one or more processors 1210 cause the one or more processors 1210 (the computing system) to perform any of the operations or functions described herein, including, for example, obtaining sensor data, generating an object observation, generating a path observation, determining an object size, generating an initial object trajectory, generating a refined object trajectory, determining a motion plan, implementing a motion plan, updating a machine-learned model, and so on.

In some implementations, the machine learning computing system 1200 includes one or more server computing devices. If the machine learning computing system 1200 includes multiple server computing devices, such server computing devices can operate according to various computing architectures, including, for example, sequential computing architectures, parallel computing architectures, or some combination thereof.

In addition, or alternatively to the model(s) 1235 at the computing system 1100, the machine learning computing system 1200 can include one or more machine-learned models 1235. As examples, the machine-learned models 1235 can be or can otherwise include various machine-learned models such as, for example, inpainting networks, generative adversarial networks, neural networks (e.g., deep neural networks), support vector machines, decision trees, ensemble models, k-nearest neighbors models, Bayesian networks, or other types of models including linear models or non-linear models. Example neural networks include feed-forward neural networks, recurrent neural networks (e.g., long short-term memory recurrent neural networks), convolutional neural networks, or other forms of neural networks.

In some implementations, the machine learning computing system 1200 or the computing system 1100 can train the machine-learned models 1135 or 1235 through use of a model trainer 1240. The model trainer 1240 can train the machine-learned models 1135 or 1235 using one or more training or learning algorithms. One example training technique is backwards propagation of errors. In some implementations, the model trainer 1240 can perform supervised training techniques using a set of labeled training data. In other implementations, the model trainer 1240 can perform unsupervised training techniques using a set of unlabeled training data. The model trainer 1240 can perform a number of generalization techniques to improve the generalization capability of the models being trained. Generalization techniques include weight decays, dropouts, or other techniques.

In particular, the model trainer 1240 can train a machine-learned model 1135 or 1235 based on a set of training data 1245. The training data 1245 can include, for example, object data, traffic element data, hybrid graph data, data associated with the interaction prediction model, data associated with the graph neural network data, labeled sequential multi-modal sensor data indicative of a plurality of environments at different timesteps, and so on. In some implementations, the training data can include a plurality of environments previously recorded by the autonomous vehicle with dynamic objects removed. The model trainer 1240 can be implemented in hardware, firmware, or software controlling one or more processors.

The computing system 1100 and the machine learning computing system 1200 can each include a communication interface 1130 and 1250, respectively. The communication interfaces 1130/1250 can be used to communicate with one or more systems or devices, including systems or devices that are remotely located from the computing system 1100 and the machine learning computing system 1200. A communication interface 1130/1250 can include any circuits, components, software, etc. for communicating with one or more networks (e.g., 1300). In some implementations, a communication interface 1130/1250 can include, for example, one or more of a communications controller, receiver, transceiver, transmitter, port, conductors, software, or hardware for communicating data.

The network(s) 1300 can be any type of network or combination of networks that allows for communication between devices. In some embodiments, the network(s) can include one or more of a local area network, wide area network, the Internet, secure network, cellular network, mesh network, peer-to-peer communication link or some combination thereof and can include any number of wired or wireless links. Communication over the network(s) 1300 can be accomplished, for instance, through a network interface using any type of protocol, protection scheme, encoding, format, packaging, etc.

FIG. 9 illustrates one example computing system 900 that can be used to implement the present disclosure. Other computing systems can be used as well. For example, in some implementations, the computing system 1100 can include the model trainer 1240 and the training data 1245. In such implementations, the machine-learned models 1235 can be both trained and used locally at the computing system 1100. As another example, in some implementations, the computing system 1100 is not connected to other computing systems.

In addition, components illustrated or discussed as being included in one of the computing systems 1100 or 1200 can instead be included in another of the computing systems 1100 or 1200. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks or operations can be performed sequentially or in parallel. Data and instructions can be stored in a single memory device or across multiple memory devices. Computing tasks discussed herein as being performed at computing device(s) remote from the autonomous vehicle can instead be performed at the autonomous vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implements tasks and/or operations can be performed sequentially or in parallel. Data and instructions can be stored in a single memory device or across multiple memory devices.

Aspects of the disclosure have been described in terms of illustrative embodiments thereof. Numerous other embodiments, modifications, and/or variations within the scope and spirit of the appended claims can occur to persons of ordinary skill in the art from a review of this disclosure. Any and all features in the following claims can be combined and/or rearranged in any way possible. Accordingly, the scope of the present disclosure is by way of example rather than by way of limitation, and the subject disclosure does not preclude inclusion of such modifications, variations or additions to the present subject matter as would be readily apparent to one of ordinary skill in the art. Moreover, terms are described herein using lists of example elements joined by conjunctions such as "and," "or," "but," etc. It should be understood that such conjunctions are provided for explanatory purposes only. Lists joined by a particular conjunction such as "or," for example, can refer to "at least one of" or "any combination of" example elements listed therein. Also, terms such as "based on" should be understood as "based at least in part on".

Those of ordinary skill in the art, using the disclosures provided herein, will understand that the elements of any of the claims discussed herein can be adapted, rearranged, expanded, omitted, combined, or modified in various ways without deviating from the scope of the present disclosure. Some of the claims are described with a letter reference to a claim element for exemplary illustrated purposes and is not meant to be limiting. The letter references do not imply a particular order of operations. For instance, letter identifiers such as (a), (b), (c), . . . , (i), (ii), (iii), . . . , etc. may be used to illustrate method operations. Such identifiers are provided for the ease of the reader and do not denote a particular order of steps or operations. An operation illustrated by a list identifier of (a), (i), etc. can be performed before, after, and/or in parallel with another operation illustrated by a list identifier of (b), (ii), etc.

What is claimed is:

1. A computer-implemented method for generating testing data for an autonomous vehicle, the method comprising:
    (a) obtaining sensor data descriptive of a traffic scenario comprising a subject vehicle and one or more actors in an environment of the subject vehicle;
    (b) generating a perturbed trajectory for a first actor of the one or more actors in the environment based on one or more perturbation values that are selected from a defined perturbation search space by: creating a set of physically feasible trajectories for the first actor; generating an initial perturbed trajectory for the first actor based on the one or more perturbation values; and projecting the initial perturbed trajectory onto the set of physically feasible trajectories to generate the perturbed trajectory;
    (c) generating simulated sensor data comprising data descriptive of the perturbed trajectory for the first actor in the environment;
    (d) providing the simulated sensor data as input to an autonomous vehicle control system configured to process the simulated sensor data to generate an updated trajectory for the subject vehicle in the environment; and
    (e) optimizing an adversarial loss function based on the updated trajectory for the subject vehicle to generate an adversarial loss value.

2. The computer-implemented method of claim 1, wherein the adversarial loss function comprises one or more of the following:
    an imitation-learning cost term that encourages the updated trajectory to deviate from an original trajectory of the subject vehicle in the traffic scenario;

a cumulative collision cost term that encourages the perturbation values to cause the subject vehicle to collide with the one or more actors; and a comfort cost term that encourages the updated trajectory to have lane violations, high acceleration, or jerk.

3. The computer-implemented method of claim 1, wherein (b) comprises:

generating a defined perturbation search space;

selecting the one or more perturbation values from the defined perturbation search space by using a black-box optimization technique; and wherein the perturbed trajectory for the first actor is generated based on the selection of the one or more perturbation values.

4. The computer-implemented method of claim 3, wherein (b) comprises employing a reinforcement learning agent to select the perturbation values from the perturbation search space.

5. The computer-implemented method of claim 3, wherein the perturbation search space comprises initial state values and a set of change in curvatures and acceleration values over a number of timesteps.

6. The computer-implemented method of claim 1, wherein (b) comprises selecting the one or more perturbation values from a defined perturbation search space based at least in part on a set of historical observations associated with previously selected perturbation values, and wherein the method further comprises:

(f) adding the one or more perturbation values and the adversarial loss value to the set of historical observations; and after (f), repeating (a)-(d).

7. The computer-implemented method of claim 1, wherein the perturbed trajectory is parameterized as a series of kinematic bicycle model states.

8. The computer-implemented method of claim 1, wherein the autonomous vehicle control system is a simulated AV control system.

9. The computer-implemented method of claim 1, wherein (b) comprises selecting a closest reachable actor as the first actor.

10. The computer-implemented method of claim 1, wherein (b) comprises ensuring that the perturbed trajectory avoids collision with: (i) one or more existing trajectories of one or more other actors in the environment; or (ii) an initial trajectory for the subject vehicle in the environment.

11. The computer-implemented method of claim 1, wherein:

the sensor data comprises light detection and ranging (LiDAR) data; and the simulated sensor data comprises simulated LiDAR data.

12. The computer-implemented method of claim 11, wherein (d) comprises:

removing LiDAR points within a bounding box associated with the first actor, simulating new background LiDAR points after removing the LiDAR points within the bounding box;

inserting simulated LiDAR points based on the perturbed trajectory for the first actor; and removing LiDAR points included within a synthesized LiDAR shadow for one or more occluded regions based on the perturbed trajectory for the first actor.

13. The computer-implemented method of claim 1, wherein the sensor data comprises real-world sensor data previously collected by one or more physical sensors in the environment.

14. The computer-implemented method of claim 1, wherein the autonomous vehicle control system comprises one or more machine-learned models, and wherein the method further comprises updating one or more values of one or more parameters of the one or more machine-learned models based on the adversarial loss function.

15. The computer-implemented method of claim 1, wherein (b) comprises performing a black-box optimization technique to select the one or more perturbation values from a defined perturbation search space, and wherein the black-box optimization technique comprises one of the following:

Bayesian optimization;

a genetic algorithm;

random search; or a gradient estimation method.

16. The computer-implemented method of claim 1, wherein the autonomous vehicle control system comprises one of the following:

an end-to-end imitation learning system;

a neural motion planner;

a jointly learnable behavior and trajectory planning system; or a perceive, predict, and plan system.

17. A computing system comprising:

one or more processors; and one or more computer-readable medium storing instructions that when executed by the one or more processors cause the computing system to perform operations, the operations comprising:

(a) obtaining sensor data descriptive of a traffic scenario comprising a subject vehicle and one or more actors in an environment;

(b) selecting one or more perturbation values from a defined perturbation search space;

(c) generating a perturbed trajectory for a first actor of the one or more actors in the environment based on the one or more perturbation values by: creating a set of physically feasible trajectories for the first actor; generating an initial perturbed trajectory for the first actor based on the one or more perturbation values; and projecting the initial perturbed trajectory onto the set of physically feasible trajectories to generate the perturbed trajectory; and (d) generating simulated sensor data descriptive of the perturbed trajectory for the first actor in the environment.

18. The computing system of claim 17, wherein (b) comprises selecting the one or more perturbation values from the defined perturbation search space based at least in part on a set of historical observations associated with previously selected perturbation values, and wherein the operations further comprise:

(e) providing the simulated sensor data as input to an autonomous vehicle control system configured to process the simulated sensor data to generate an updated trajectory for the subject vehicle in the environment;

(f) evaluating an adversarial loss function based on the updated trajectory for the subject vehicle to generate an adversarial loss value;

(g) adding the one or more perturbation values and the adversarial loss value to the set of historical observations; and after (g), repeating (a)-(d).

19. An autonomous vehicle control system comprising:

one or more processors; and one or more non-transitory computer-readable medium storing: (i) one or more machine-learned models, wherein the one or more machine-learned models have been learned via performance of machine learning algorithms on one or more training examples comprising simulated sensor data; and (ii) instructions for execution by the one or more processors to cause the one or more processors to perform operations to generate the simulated sensor data, the operations comprising:

(a) obtaining sensor data descriptive of a traffic scenario comprising a subject vehicle and one or more actors in an environment;

(b) selecting one or more perturbation values from a defined perturbation search space;

(c) generating a perturbed trajectory for a first actor of the one or more actors in the environment based on the one or more perturbation values by: creating a set of physically feasible trajectories for the first actor; generating an initial perturbed trajectory for the first actor based on the one or more perturbation values; and projecting the initial perturbed trajectory onto the set of physically feasible trajectories to generate the perturbed trajectory; and (d) generating simulated sensor data descriptive of the perturbed trajectory for the first actor in the environment.

* * * * *